US012105238B2

(12) United States Patent
Tenghamn et al.

(10) Patent No.: US 12,105,238 B2
(45) Date of Patent: Oct. 1, 2024

(54) LONG OFFSET ACQUISITION

(71) Applicant: PGS GEOPHYSICAL AS, Oslo (NO)

(72) Inventors: Stig Rune Lennart Tenghamn, Hollywood, FL (US); Neil Paddy, Houston, TX (US); Manuel Beitz, Oslo (NO)

(73) Assignee: PGS Geophysical AS, Oslo (NO)

( * ) Notice: Subject to any disclaimer, the term of this patent is extended or adjusted under 35 U.S.C. 154(b) by 327 days.

(21) Appl. No.: 17/253,534

(22) PCT Filed: Jun. 19, 2019

(86) PCT No.: PCT/US2019/038035
§ 371 (c)(1),
(2) Date: Dec. 17, 2020

(87) PCT Pub. No.: WO2019/246297
PCT Pub. Date: Dec. 26, 2019

(65) Prior Publication Data
US 2021/0141117 A1    May 13, 2021

Related U.S. Application Data

(60) Provisional application No. 62/808,178, filed on Feb. 20, 2019, provisional application No. 62/771,071, (Continued)

(51) Int. Cl.
*G01V 1/38*    (2006.01)
*G01V 3/17*    (2006.01)
*G01V 11/00*   (2006.01)

(52) U.S. Cl.
CPC .............. *G01V 1/38* (2013.01); *G01V 1/3808* (2013.01); *G01V 1/3843* (2013.01); *G01V 3/17* (2013.01);
(Continued)

(58) Field of Classification Search
CPC ...... G01V 1/38; G01V 1/3808; G01V 1/3843; G01V 2210/167
See application file for complete search history.

(56) References Cited

U.S. PATENT DOCUMENTS 2,757,356 A    7/1956  Haggerty
3,744,021 A    7/1973  Todd
(Continued)

FOREIGN PATENT DOCUMENTS

CA    2300116 A1    3/1999
EP    2 261 615 A2   12/2010
(Continued)

OTHER PUBLICATIONS

A.S. Long et. al, "Simultaneous Long Offset (SLO) Towed Streamer Seismic Acquisition", Jun. 2013, accessed by web https://www.pgs.com/globalassets/technical-library/whitepapers-library/2013june_pgs_long_etal_slo.pdf, 5 pages.
(Continued)

*Primary Examiner* — Daniel L Murphy
*Assistant Examiner* — Amie M Ndure

(57) ABSTRACT

A long-offset acquisition system includes a source vessel; a signal source coupled to the source vessel; and a long-offset streamer coupled to a survey vessel and including an aft-most receiver, an offset of the aft-most receiver being at least 12 km. A long-offset acquisition method includes towing a signal source with a source vessel; towing a first long-offset streamer with a survey vessel; and acquiring data with receivers of the first long-offset streamer. A long-offset acquisition method includes towing a signal source with a first survey vessel; towing a long-offset streamer with a second survey vessel, the long-offset streamer having a plurality of receivers; actuating the signal source while an offset between the signal source and at least one of the
(Continued)

plurality of receivers is at least 15 km; and acquiring data with receivers of the long-offset streamer.

13 Claims, 12 Drawing Sheets

Related U.S. Application Data filed on Nov. 24, 2018, provisional application No. 62/687,415, filed on Jun. 20, 2018.

(52) U.S. Cl.
CPC ........ *G01V 11/00* (2013.01); *G01V 2210/167* (2013.01)

(56) References Cited

U.S. PATENT DOCUMENTS

| | | | |
|---|---|---|---|
| 4,693,336 A | 9/1987 | Newman | |
| 4,914,636 A | 4/1990 | Garotta | |
| 4,970,696 A | 11/1990 | Crews et al. | |
| 5,083,297 A | 1/1992 | Ostrander | |
| 5,148,406 A * | 9/1992 | Brink | G01V 1/3808 702/14 |
| 5,345,522 A | 9/1994 | Vali et al. | |
| 5,424,999 A | 6/1995 | Manin | |
| 5,761,152 A * | 6/1998 | Jacobsen | G01V 1/3808 367/20 |
| 5,973,995 A | 10/1999 | Walker et al. | |
| 6,510,390 B1 | 1/2003 | Bunting et al. | |
| 6,925,386 B2 * | 8/2005 | Pramik | G01V 1/28 702/14 |
| 7,123,543 B2 | 10/2006 | Vaage et al. | |
| 7,379,386 B2 | 5/2008 | Muyzert et al. | |
| 7,450,467 B2 | 11/2008 | Tveide et al. | |
| 7,577,060 B2 * | 8/2009 | Toennessen | B63B 21/663 367/19 |
| 7,957,221 B2 | 6/2011 | Kluver et al. | |
| 8,873,332 B2 | 10/2014 | Mandroux et al. | |
| 8,908,469 B2 | 12/2014 | Hill et al. | |
| 9,019,796 B2 * | 4/2015 | Guevel | G01V 1/38 367/20 |
| 9,075,162 B2 | 7/2015 | Baardman et al. | |
| 9,103,943 B2 | 8/2015 | Cowlard et al. | |
| 9,250,345 B2 | 2/2016 | Mattsson | |
| 9,261,619 B2 | 2/2016 | Mandroux et al. | |
| 9,310,503 B2 | 4/2016 | Rentsch et al. | |
| 9,360,575 B2 | 6/2016 | Etienne et al. | |
| 9,405,029 B2 | 8/2016 | Howieson et al. | |
| 9,429,667 B2 | 8/2016 | Vyas et al. | |
| 9,513,391 B2 | 12/2016 | Keers et al. | |
| 9,599,735 B2 | 3/2017 | Oscarsson | |
| 9,651,695 B2 | 5/2017 | Lu et al. | |
| 9,733,376 B2 | 8/2017 | Landais et al. | |
| 9,772,418 B2 | 9/2017 | Sykes | |
| 9,880,047 B2 | 1/2018 | Martin et al. | |
| 9,880,048 B2 | 1/2018 | Martin et al. | |
| 9,897,713 B2 | 2/2018 | Vageskar et al. | |
| 9,910,175 B1 * | 3/2018 | Majzlik | G01V 1/30 |
| 9,910,176 B2 | 3/2018 | McKey, III | |
| 9,932,093 B2 | 4/2018 | Sudow et al. | |
| 9,958,564 B2 | 5/2018 | Grenie et al. | |
| 10,001,576 B2 | 6/2018 | Grenie et al. | |
| 10,031,248 B2 * | 7/2018 | Bernitsas | G01V 1/3808 |
| 10,042,073 B2 | 8/2018 | Bjornemo et al. | |
| 10,054,705 B2 | 8/2018 | Hillesund et al. | |
| 10,073,184 B2 | 9/2018 | Faber et al. | |
| 10,094,942 B2 | 10/2018 | Brenders et al. | |
| 10,139,269 B2 | 11/2018 | Den Boer et al. | |
| 10,139,511 B2 | 11/2018 | Mensch | |
| 10,234,585 B2 | 3/2019 | Long | |
| 10,267,939 B2 | 4/2019 | Eick et al. | |
| 10,281,602 B2 | 5/2019 | Moldoveanu et al. | |
| 10,310,124 B1 * | 6/2019 | Scott | G01V 1/164 |
| 10,338,258 B2 | 7/2019 | Chalenski | |
| 10,379,256 B2 | 8/2019 | Adams et al. | |
| 10,459,100 B2 | 10/2019 | Hegna | |
| 10,479,455 B2 | 11/2019 | Toennessen | |
| 10,557,761 B2 | 2/2020 | Molteni et al. | |
| 10,627,534 B2 | 4/2020 | Bernitsas | |
| 10,712,463 B2 | 7/2020 | Leveille et al. | |
| 11,480,700 B2 | 10/2022 | Siliqi et al. | |
| 2005/0128874 A1 * | 6/2005 | Herkenhoff | G01V 1/3808 367/56 |
| 2005/0190650 A1 * | 9/2005 | Ferber | G01V 1/364 367/43 |
| 2006/0133200 A1 * | 6/2006 | Tenghamn | G01V 1/3826 367/17 |
| 2007/0165486 A1 * | 7/2007 | Moldoveanu | G01V 1/3808 367/15 |
| 2008/0137480 A1 | 6/2008 | MacNeill | |
| 2008/0144438 A1 * | 6/2008 | Ferber | G01V 1/20 367/56 |
| 2008/0225642 A1 * | 9/2008 | Moore | G01V 1/28 367/73 |
| 2008/0285381 A1 * | 11/2008 | Moldoveanu | G01V 1/3808 367/20 |
| 2009/0147620 A1 | 6/2009 | Pan et al. | |
| 2009/0296518 A1 | 12/2009 | MacNeill et al. | |
| 2009/0296520 A1 | 12/2009 | Keers et al. | |
| 2010/0313659 A1 | 12/2010 | Berg et al. | |
| 2011/0090760 A1 | 4/2011 | Rickett et al. | |
| 2011/0199857 A1 | 8/2011 | Garden et al. | |
| 2011/0305107 A1 | 12/2011 | Eick et al. | |
| 2012/0014212 A1 | 1/2012 | Eick et al. | |
| 2012/0020184 A1 | 1/2012 | Wilson et al. | |
| 2012/0092956 A1 | 4/2012 | Soubaras | |
| 2012/0227504 A1 | 9/2012 | Goldner et al. | |
| 2012/0300583 A1 * | 11/2012 | Flynn | G01V 1/003 367/73 |
| 2013/0114373 A1 | 5/2013 | Mandroux et al. | |
| 2013/0170316 A1 * | 7/2013 | Mandroux | G01V 1/3808 367/16 |
| 2013/0188448 A1 * | 7/2013 | Siliqi | G01V 1/3808 367/15 |
| 2014/0160885 A1 | 6/2014 | Tenghamn | |
| 2014/0198611 A1 * | 7/2014 | Siliqi | G01V 1/3808 367/20 |
| 2014/0241118 A1 | 8/2014 | Landais et al. | |
| 2015/0003195 A1 * | 1/2015 | Widmaier | G01V 1/3808 367/16 |
| 2015/0009779 A1 | 1/2015 | Mandroux et al. | |
| 2015/0078124 A1 | 3/2015 | Lu et al. | |
| 2015/0234065 A1 | 8/2015 | Lecocq et al. | |
| 2015/0241587 A1 | 8/2015 | Baardman | |
| 2015/0293250 A1 | 10/2015 | Baardman et al. | |
| 2015/0309199 A1 * | 10/2015 | Styles | G05D 1/0206 701/21 |
| 2015/0331127 A1 * | 11/2015 | Brookes | G01V 1/36 367/16 |
| 2016/0097870 A1 | 4/2016 | Routh et al. | |
| 2016/0131785 A1 | 5/2016 | Tonchia | |
| 2016/0139284 A1 * | 5/2016 | Meech | G01V 1/3808 367/14 |
| 2016/0178776 A1 * | 6/2016 | Bernitsas | G01V 1/3808 367/20 |
| 2016/0187504 A1 | 6/2016 | Brenders et al. | |
| 2016/0202378 A1 | 7/2016 | Ridsdill-Smith et al. | |
| 2016/0245941 A1 | 8/2016 | Ronholt et al. | |
| 2016/0356907 A1 | 12/2016 | Mensch | |
| 2016/0363682 A1 * | 12/2016 | Grenie | G01V 1/3808 |
| 2017/0075075 A1 | 3/2017 | Mandroux et al. | |
| 2017/0075011 A1 | 3/2017 | Ni et al. | |
| 2017/0168178 A1 | 6/2017 | Crawley et al. | |
| 2017/0176636 A1 | 6/2017 | Adams et al. | |
| 2017/0205270 A1 * | 7/2017 | Moldoveanu | G01V 1/3808 |
| 2017/0285197 A1 | 10/2017 | Bernitsas | |
| 2017/0363760 A1 | 12/2017 | Mensch et al. | |
| 2017/0371069 A1 | 12/2017 | Malling | |
| 2018/0002526 A1 | 1/2018 | Hillesund | |
| 2018/0156933 A1 | 6/2018 | Ahmed | |
| 2018/0164456 A1 | 6/2018 | Chalenski | |

(56) References Cited

U.S. PATENT DOCUMENTS

| | | | |
|---|---|---|---|
| 2018/0164457 | A1 | 6/2018 | Beitz et al. |
| 2018/0172856 | A1 | 6/2018 | Hillesund |
| 2018/0259666 | A1* | 9/2018 | Siliqi .................. G01V 1/3808 |
| 2018/0274953 | A1 | 9/2018 | Molteni |
| 2019/0064380 | A1 | 2/2019 | Sharma |
| 2019/0154858 | A1 | 5/2019 | Long |
| 2020/0393590 | A1 | 12/2020 | Tenghamn |
| 2021/0124073 | A1 | 4/2021 | Tenghamn |
| 2021/0124074 | A1 | 4/2021 | Tenghman |
| 2021/0141117 | A1 | 5/2021 | Tenghamn et al. |
| 2023/0273334 | A1 | 8/2023 | Cramer et al. |

FOREIGN PATENT DOCUMENTS

| | | |
|---|---|---|
| EP | 3 088 919 A1 | 11/2016 |
| EP | 3 101 451 A1 | 12/2016 |
| GB | 1506189 A | 4/1978 |
| GB | 2 394 051 A | 4/2004 |
| GB | 2 404 025 A | 1/2005 |
| GB | 2425596 A | 11/2006 |
| GB | 2460073 A | 11/2009 |
| GB | 2491260 A | 11/2012 |
| GB | 2494040 A | 2/2013 |
| GB | 2 497 645 A | 6/2013 |
| GB | 2 515 658 A | 12/2014 |
| GB | 2 536 052 A | 9/2016 |
| GB | 2567059 A | 4/2019 |
| GB | 2 589 011 A | 5/2021 |
| GB | 2599849 A | 4/2022 |
| WO | 9618117 A1 | 6/1996 |
| WO | 2009 131 619 A2 | 10/2009 |
| WO | 2012 054 635 A2 | 4/2012 |
| WO | 2014 022 346 A1 | 2/2014 |
| WO | 2014 161 044 A1 | 10/2014 |
| WO | 2015 011 247 A1 | 1/2015 |
| WO | 2015195939 A1 | 12/2015 |
| WO | 2016 011 250 A1 | 1/2016 |
| WO | 2016009270 A1 | 1/2016 |
| WO | 2017102289 A1 | 6/2017 |
| WO | 2017 195 093 A1 | 11/2017 |
| WO | 2018 217 872 A1 | 11/2018 |
| WO | 2018 229 553 A1 | 12/2018 |
| WO | 2019 018 894 A1 | 1/2019 |
| WO | 2019 043 452 A1 | 3/2019 |
| WO | 2019 246 297 A1 | 12/2019 |
| WO | 2020 008 259 A1 | 1/2020 |
| WO | 2022 016 049 A1 | 1/2022 |

OTHER PUBLICATIONS

Tech Link, A Publication of PGS Geophysical, "Continuous Long Offset (CLO) Acquisition Technology", vol. 6 No. 4, Apr. 2006, 4 pages.

PGS Article, "3D Spread Control", Control of streamer depth and lateral position, Sep. 6, 2018, accessed by web, https://www.pgs.com/marine-acquisition/tools-and-techniques/operational-efficiency/technology/streamer-steering/, 3 pages.

A. Long, "Increasing Towed Streamer Survey Efficiency", Aug. 18, 2018, accessed by web https://www.pgs.com/globalassets/technical-library/tech-lib-pdfs/industry_insights_increasing-towed-streamer-survey-efficiency_aug2018_al.pdf, 15 pages.

PGS Article, "Ramform + Triple Source = Ultra HD3D", Jun. 1, 2018, accessed by web https://www.pgs.com/publications/feature-stories/ramform-plus-triple-source-equals-ultra-hd3d/, 5 pages.

Fromyr, Eivind, PGS "Blended Acquisition—A potential step-change in geophysical flexibility and operational efficiency", SBGf, Fifteenth International Congress of the Brazilian Geophysical Society, pp. 768-771, 2019, 4 pages.

Brenders, Andrew et al., "Realistic Signal-to-Noise Ratios for Synthetic Seismic Data: Calibrating with Measured Noise and Applications to Waveform Inversion", SEG International Exposition and 86th Annual Meeting, pp. 3992-3996, copyright 2016 SEG, 5 pages.

Brenders, Drew et al., Realistic signal-to-noise ratios for synthetic seismic data: Calibrating with measured noise and applications to waveform inversion, Presentation, Society of Exploration Geophysicists, 49 pages.

Dellinger, Joe et al., "Wolfspar®, an FWI-friendly" ultra-low-frequency marine seismic source, SEG International Exposition and 86th Annual Meeting, pp. 4891-4895, Copyright 2016 SEG, 5 pages.

Dellinger, Joe et al., "Wolfspar®, an FWI-friendly" ultra-low-frequency marine seismic source, Presentation, Society of Exploration Geophysicists, 47 pages.

Dellinger, Joe et al., "Challenges to extending the usable seismic bandwidth at the seafloor in the deep water GoM", SEG International Exposition and 86th Annual Meeting, pp. 66-70, Copyright 2016 SEG, 5 pages.

Dellinger, Joe et al., "Challenges to extending the usable seismic bandwidth at the seafloor in the deep water GoM", Presentation, Society of Exploration Geophysicists, 50 pages.

Cortland Company Brochure, Seismic Tow Cables, Umbilicals, Straps and Ropes, 7 pages.

United Kingdom Examination Report dated Jan. 25, 2022, for Application No. GB2100684.6.

United Kingdom Examination Report dated May 11, 2022, for Application No. GB2100684.6.

International Search Report and Written Opinion for Application No. PCT/US2019/38035 dated Sep. 9, 2019.

GB Examination Report in GB2017036.1 dated Apr. 4, 2022.
GB Examination Report in GB2017036.1 dated Sep. 20, 2021.
GB Examination Report in GB1813957.6 dated Nov. 8, 2021.
GB Examination Report in GB2017036.1 dated Feb. 14, 2022.
GB Examination Report in GB2203858.2 dated Apr. 1, 2022.
GB Examination Report in GB2017036.1 dated Jun. 17, 2022.
GB Search Report in GB1813957.6 dated Jan. 24, 2019.
GB Search Report in GB2017061.9 dated Mar. 15, 2021.
GB Examination Report in GB2017061.9 dated Jul. 14, 2023.

International Search Report and Written Opinion in PCT/US2021/041957 dated Oct. 27, 2021.

Alfaro, et al., "Reducing Exploration Risk," Oilfield Review, Spring 2007 Issue, pp. 26-43 {Schlumberger, Spring 2007).

Chemingui, et al., "Full Waveform Inversion of Simultaneous Long-Offset Data," presented at EAGE 81st Annual Conference & Exhibition 2019 (EAGE Jun. 3, 2019).

Chemingui, et al., "Full waveform inversion of simultaneous long-offset data," AEGC 2019: From Data to Discovery—Perth, Australia, pp. 1-6.

Duey, "All in One, Vessel Deploys Streamers and Nodes while Providing Sources" E&P Nov. 2017.

Karlsson, et al., "Multivessel Surveying Reduces Seismic Cost, Acquisition Time," Offshore, vol. 51, No. 3, pp. 34-37 (Petroleum Publishing Co. Mar. 1, 1991) Abstract.

Lambert, et al., "Seismic Acquisition: Marine seismic survey positioning and control requirements evolve," Offshore Magazine, Mar. 1, 2003, 10 pages.

Long, "Evolutions in seismic azimuth: past, present and future," Geohorizons, Jul. 2009, pp. 1-14.

Long, et al. "Simultaneous Long Offset {SLO) Towed Streamer Seismic Acquisition," ASEG Extended Abstracts, J013:1, 1-4 {ASEG, Feb. 12, 2019).

Lopez, et al., "Fully Autonomous Marine Seismic Acquisition Systems for Rerservoir Monitoring," prepared or presentation during the 16th International Congress of the Brazilian Geophysical Society held in Rio de Janeiro, Brazil, Aug. 19-22, 2019, pp. 1-5.

Mensch, et al., "Acquisition of Long-Offset Data Offshore Gabon Shows How Synchronized Source Technology Adds Flexibility to Tailored Acquisition Solutions," First Break, vol. 34, Nov. 2016 {EAGE, Nov. 2016).

Molteni, et al., "Use of distributed fibre—Optic sensing for marine seismic measurements," Special Topic: Petroleum Geology and Basins, First Break (EAGE publication), vol. 34, Dec. 2016, pp. 53-60.

PGS Geophysical, "Multi-Vessel Configurations," https://www.pgs.com/marine-acquisition/lools-and-echniques/ acquisition as downloaded Oct. 19, 2019, 6 pages.

(56) References Cited

OTHER PUBLICATIONS

Poole, et al., "Shot-to-shot directional designature using near-field hydrophone data," SEG Houston 2013 Annual Meeting, 5 pages.

Press Release, "SeaBird to enter into a strategic cooperation with PGS for deep water node seismic and to issue a NOK 240 million convertibel loan to PGS" (Cyprus Jan. 27, 2011).

Tapie, et al., "Optimizing Seismic Survey Design for Frontier Exploration in Cyprus Sall Basins," SEG I MPG nlemalional Meeting for Applied Geoscience and Energy {Aug. 31, 2023).

Tham, et al., "A Cost-Effective and Efficient Solution for Marine Seismic Acquisition in Obstructed Areas—Acquiring Ocean-Bottom and Towed-Streamer Seismic Data with a Single Multipurpose Vessel," 2017 SEG Workshop: OBN/OBC Technologies and Applications (SEG 2017).

Unger, et al., "Exploration: Redefining Multi-Azimuth Seismic Acquisition," https://www.hartenergy.com/ xclusives/redefining-multi-azimuth-seismic-acquisition-187435, May 2020, 5 pages.

Van Borselen, et al., "Simultaneous Long Offset {SLO)—A Case Study in Long Offset GeoStreamer Seismic Acquisition & Processing," 6th EAGE Saint Petersburg International Conference and Exhibition, vol. 2014, pp. 1-5 EAGE, Apr. 2014).

Vermeer, "Wide-Azimuth Towed Streamer Data Acquisition and Simultaneous Sources," The Leading Edge, vol. 28, Issue 8, pp. 260-268 {SEG, Aug. 2009).

U.S. Appl. No. 18/377,237 filed Oct. 5, 2023.

AU Examination Report in AU2019290138 dated Jan. 16, 2024.

International Search Report and Written Opinion in PCT/EP2023/078366 dated Feb. 2, 2024.

Examination Report in BR112020025667-6 dated Jun. 25, 2024.

\* cited by examiner

LONG OFFSET ACQUISITION

CROSS REFERENCE TO RELATED APPLICATIONS

This application claims benefit of PCT Patent Application Serial Number PCT/US 19/38035, filed Jun. 19, 2019, entitled "Long Offset Acquisition," U.S. Provisional Patent Application Ser. No. 62/687,415, filed Jun. 20, 2018, entitled "Long Offset Acquisition," U.S. Provisional Patent Application Ser. No. 62/771,071, filed Nov. 24, 2018, entitled "Long Offset Acquisition," and U.S. Provisional Patent Application Ser. No. 62/808,178, filed Feb. 20, 2019, entitled "Rats Tail Acquisition Configuration," each of which is incorporated herein by reference.

BACKGROUND

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and geophysical sensors—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby collect survey data which can be useful in the discovery and/or extraction of hydrocarbons from subsurface formations.

Some marine surveys deploy sources and receivers at long offsets to better acquire certain types of data. For example, long offsets may be beneficial for sub-salt and pre-salt imaging. As another example, some ultra-low-frequency (e.g., as low as 1.6 Hz) sources may utilize long offsets (e.g., over 30 km) to acquire data optimized for full-waveform inversion (FWI). Continuous long-offset (CLO) acquisition combines a dual source-vessel operation using only short streamers with a smart recording technique involving overlapping records (see van Mastrigt, P., Vaage, S., Dunn, M. and Pramik, B. [2002] "Improvements in 3-D marine acquisition using continuous long offset (CLO)." *The Leading Edge*, 21, 394-399.). While dual source-vessel operations can increase the offset to effectively twice the streamer length, the inline shot spacing is also doubled in comparison to conventional single source-vessel operations. Simultaneous long-offset (SLO) acquisition modifies CLO acquisition by utilizing simultaneous shooting of forward and rear source vessels to halve the CLO inline shot spacing. However, both CLO and SLO incur expenses and risks associated with an extra source vessel. For example, extra source vessels tend to increase noise levels in the survey data. Additionally, some parties believe that extra source vessels increase environmental harm. Therefore, some jurisdictions prohibit the use of more than one source vessel when conducting a seismic survey.

Improved equipment and methods for acquiring long-offset data would be beneficial.

BRIEF DESCRIPTION OF THE DRAWINGS

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
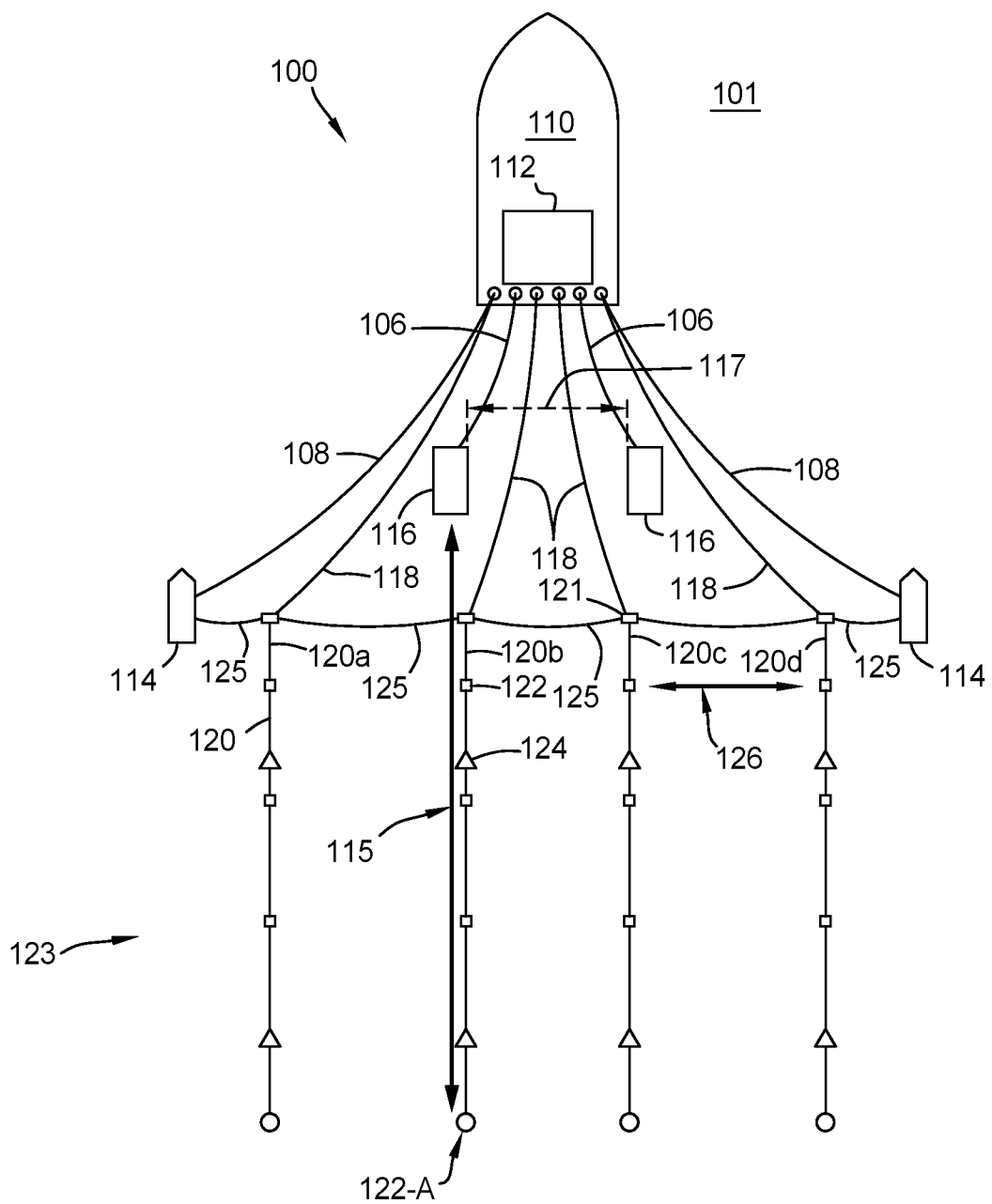
FIG. 1 illustrates a conventional marine geophysical survey system.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

"Axial direction" shall mean the inline towing direction of an object or system.

"Lateral direction" shall mean the crossline towing direction of an object or system.

"Offset" shall mean the nominal inline distance between the source and the receiver.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Lead-in line" shall mean a line that couples (e.g., axial load, data, and/or power) a survey vessel to a streamer or streamer array (e.g., a survey spread). Often, lead-in lines are selected, designed, and/or manufactured to meet operational conditions. For example, the axial strength of a lead-in line will impact the acceptable drag from the survey spread and the acceptable towing velocities and/or accelerations. Additionally, lead-in lines may be designed to provide a high signal and/or power carrying capacity while having a small outer diameter. Unlike streamers, lead-in lines do not include receivers for measuring geophysical (e.g., seismic, electromagnetic) signals.

"Source vessel" shall mean a watercraft, manned or unmanned, that is configured to carry and/or tow, and in practice does carry and/or tow, one or more geophysical sources. Source vessels may optionally be configured to tow one or more geophysical streamers.

"Streamer vessel" shall mean a watercraft, manned or unmanned, that is configured to tow one or more geophysical streamers. Unless otherwise specified, streamer vessels should be understood to not carry or tow one or more geophysical sources.

"Survey vessel" shall mean a source vessel or a streamer vessel.

"Submerged" shall mean that an object resides fully below the surface of the water. If any portion of the object resides above the surface, then the object shall not be considered submerged. "Submerges" shall mean that an object becomes submerged.

"Buoyancy" of an object shall refer to buoyancy of the object taking into account any weight supported by the object.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the surveying operation. As another example, the two or more events may occur during time periods that overlap by about 40% to about 100% of either period.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine seismic and/or electromagnetic survey methods and apparatuses, and, at least in some embodiments, to novel acquisition system configurations, and their associated methods of use.

One of the many potential advantages of the embodiments of the present disclosure is that long-offset data may be acquired with a single source vessel. Another potential advantage includes acquiring data at standard offsets and long offsets simultaneously. Another potential advantage includes flexibility in survey design, including acquiring data at standard offsets and long offsets simultaneously for a portion of a survey, while acquiring only standard-offset data for another portion of the survey. Since fewer source vessels are utilized, costs, and risks to crew and environment are likewise reduced. Another potential advantage includes acquiring very long offset data, including low-frequency/long-offset data, useful for full-waveform inversion (FWI). Embodiments of the present disclosure can thereby be useful in the discovery and/or extraction of hydrocarbons from subsurface formations.

In some embodiments, long-offset lead-in lines may be used to tow a few (e.g., two to five) long-offset streamers behind a standard-offset survey spread. In some embodiments, the offsets of the receivers on the long-offset streamers may be at least double the offsets of the receivers on the standard-offset survey spread. In some embodiments, the number of long-offset streamers may be much less than the number of streamers in the standard-offset survey spread. In some embodiments, the long-offset streamers may specifically acquire low-frequency data (e.g., low-frequency seismic signals).

FIG. 1 illustrates a conventional marine geophysical survey system 100. System 100 includes source vessel 110 that may be configured to move along a surface of body of water 101 (e.g., an ocean or a lake). In FIG. 1, source vessel 110 tows signal sources 116 and standard streamers 120. As used herein, the term "signal source" or "source element" refers to an apparatus that is configured to emit a signal (e.g., acoustic, electromagnetic, etc.) that may be reflected from one or more subsurface structures and then detected and/or measured. As used herein, the term "streamer" refers to an apparatus (e.g., a cable) that may be towed behind a survey vessel (e.g., a source vessel or a streamer vessel) to detect such signals, and thus may include detectors, sensors, receivers, and/or other structures configured to measure the reflected signal (e.g., by using hydrophones, geophones, electrodes, etc., positioned along or within the streamer). The standard streamers 120 may be of conventional length. For example, each standard streamer 120 may be between about 5 km and about 12 km long.

Signal sources 116 are shown in FIG. 1 being towed by source vessel 110 using source cables 106. Each of signal sources 116 may include sub-arrays of multiple individual signal sources. For example, signal source 116 may include a plurality of seismic sources, such as air guns or marine vibrators, and/or electromagnetic signal sources. As illustrated, the two signal sources 116 are distributed about a midline of source vessel 110 and distanced from one another by a nominal crossline source separation 117, which may be greater than, equal to, or less than nominal crossline streamer spacing 126. The signal sources 116 may be independently activated, activated simultaneously, activated in a sequential pattern, and/or activated randomly with respect to one another. In some embodiments (not shown), signal sources 116 may be distributed asymmetrically with respect to the midline of source vessel 110.

Standard streamers 120 may include a variety of receivers 122. Receivers 122 may include seismic receivers or sensors, such as hydrophones, pressure sensors, geophones, particle motion sensors, and/or accelerometers. Receivers 122 may include electromagnetic sensors, such as electrodes or magnetometers. Receivers 122 may include any suitable combination of these and/or other types of geophysical sensors. Standard streamers 120 may further include streamer steering devices 124 (also referred to as "birds") which may provide controlled lateral and/or vertical forces to standard streamers 120 as they are towed through the water, typically based on wings or hydrofoils that provide hydrodynamic lift. Standard streamers 120 may further include tail buoys (not shown) at their respective back ends. The number and distribution of receivers 122, streamer steering devices 124, and tail buoys along each standard streamer 120 may be selected in accordance with manufacturing and operational circumstances or preferences.

As illustrated in FIG. 1, standard streamers 120 are coupled to source vessel 110 via standard lead-in lines 118 and lead-in terminations 121. Standard lead-in lines 118 may generally be between about 750 m and about 1500 m, or more specifically between about 1000 m and about 1200 m in total length. Typically, about half of the total length of standard lead-in line 118 will be in the water. For example, about 400 m-500 m of standard lead-in line 118 may be in the water during operation. Lead-in terminations 121 may be coupled to or associated with spreader lines 125 so as to nominally fix the lateral positions of standard streamers 120 with respect to each other and with respect to a centerline of source vessel 110. Standard streamers 120*a*-120*d* may be nominally fixed in lateral positions with respect to each other in order to form a standard-offset survey spread 123 (e.g., a narrow azimuth spread, and/or a 3D acquisition spread) to collect geophysical survey data as source vessel 110 traverses the surface of body of water 101. In a standard-offset survey spread 123, the nominal crossline streamer spacing 126 may range from about 25 m to about 200 m. As shown, system 100 may also include two paravanes 114 coupled to source vessel 110 via paravane tow lines 108. Paravanes 114 may be used to provide a streamer separation force for standard-offset survey spread 123.

In various embodiments, a geophysical survey system may include any appropriate number of towed signal sources 116 and standard streamers 120. For example, FIG. 1 shows two signal sources 116 and four standard streamers 120. It should be appreciated that standard-offset survey spreads 123 commonly include as few as 2 and as many as 24 or more standard streamers 120. In one embodiment, for example, source vessel 110 may tow eighteen or more standard streamers 120. A geophysical survey system with an increased number of signal sources 116 and/or standard streamers 120 may allow for more survey data to be collected and/or a wider standard-offset survey spread 123 to be achieved. The width of a survey spread may be determined by the crossline streamer spacing 126 and the number of streamers in the survey spread. For example, standard-offset survey spread 123 may have a width of between about 300 m and about 3 km.

Geodetic position (or "position") of the various elements of system 100 may be determined using various devices, including navigation equipment such as relative acoustic ranging units and/or global navigation satellite systems (e.g., a global positioning system (GPS)).

Source vessel 110 may include equipment, shown generally at 112 and for convenience collectively referred to as a "recording system." Recording system 112 may include devices such as a data recording unit (not shown separately) for making a record (e.g., with respect to time) of signals collected by various geophysical sensors. For example, in various embodiments, recording system 112 may be configured to record reflected signals detected or measured by receivers 122 while source vessel 110 traverses the surface of body of water 101. Recording system 112 may also include navigation equipment (not shown separately), which may be configured to control, determine, and record, at selected times, the geodetic positions of: source vessel 110, signal sources 116, standard streamers 120, receivers 122, etc. Recording system 112 may also include a communication system for communicating between the various elements of system 100, with other vessels, with on-shore facilities, etc.

As illustrated, system 100 has aft-most receivers 122-A. For example, each aft-most receiver 122-A may be at or near the aft-most end of a standard streamer 120. In the illustrated embodiment, aft-most receiver 122-A is aft of each illustrated streamer steering device 124, but other configurations are possible. The inline distance between signal source 116 and aft-most receiver 122-A is the longest offset 115 of system 100. Typically, conventional marine geophysical survey systems 100 have longest offsets 115 of between about 5 km and about 12 km.

Figure 2:
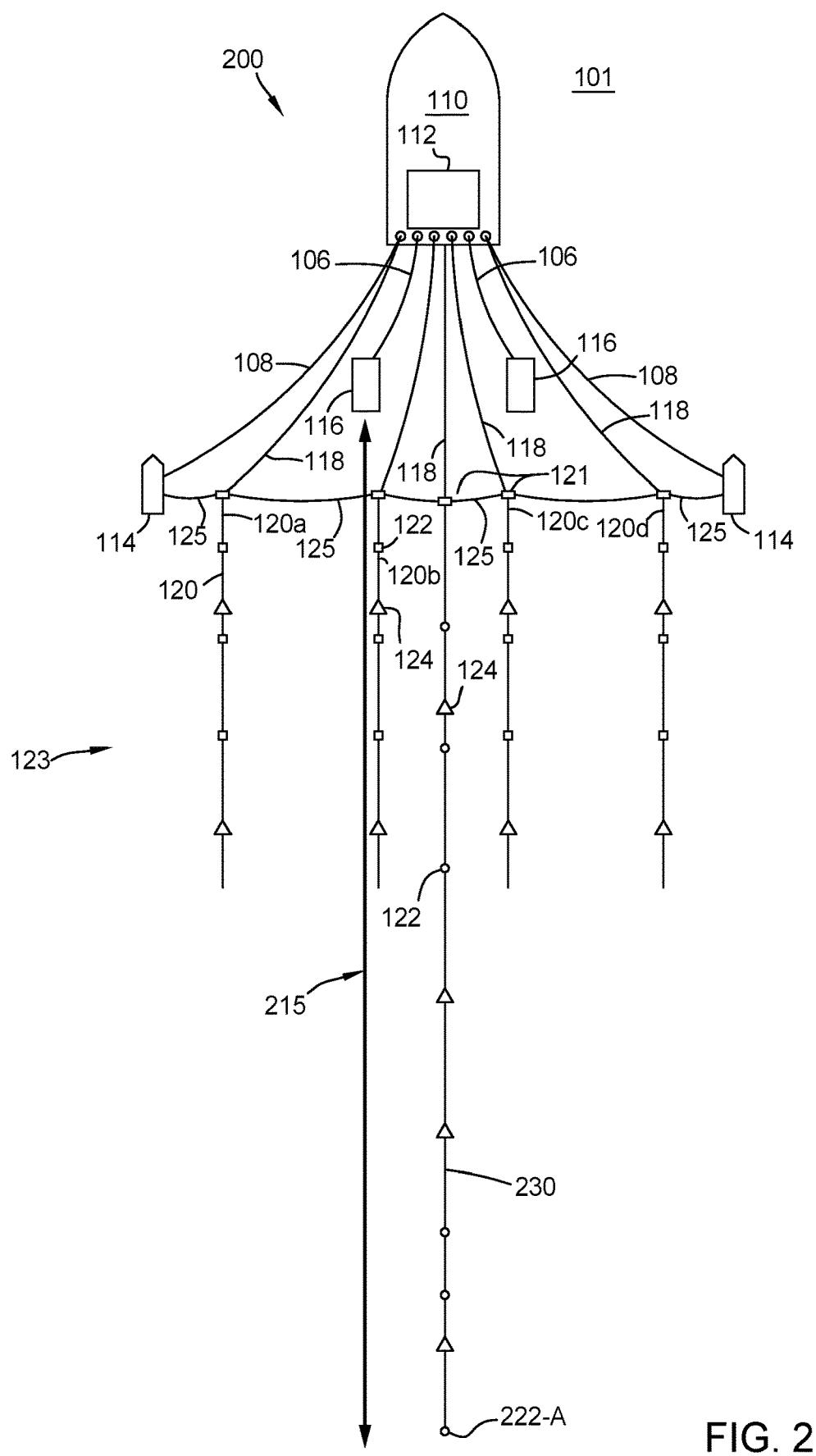
FIG. 2 illustrates an exemplary embodiment of a marine geophysical survey system configured for long-offset acquisition.

FIG. 2 illustrates an exemplary embodiment of a marine geophysical survey system 200 configured for long-offset acquisition. In many aspects, system 200 is configured similarly to system 100. However, system 200 includes a long-offset streamer 230. For example, each standard streamer 120 may be between about 5 km and about 12 km long, while long-offset streamer 230 may be between about 12 km and about 40 km long. As illustrated, long-offset streamer 230 is coupled to source vessel 110 via a standard lead-in line 118 and a lead-in termination 121. In some embodiments, the lead-in termination 121 of long-offset streamer 230 may be coupled to or associated with spreader lines 125 so as to nominally fix the lateral positions of long-offset streamers 230 with respect to standard streamers 120. As with standard streamers 120, long-offset streamer 230 may include receivers 122, streamer steering devices 124, and tail buoys. The number and distribution of receivers 122, streamer steering devices 124, and tail buoys along long-offset streamer 230 may be selected in accordance with manufacturing and operational circumstances or preferences. In some embodiments, receivers 122 on long-offset streamer 230 may be low-frequency seismic receivers configured to detect and/or measure low-frequency seismic signals (e.g., between about 1 Hz and about 30 Hz, or between about 1 Hz and about 7 Hz). In some embodiments, system 200 may have an aft-most receiver 222-A providing a longest offset 215 of between about 12 km and about 40 km.

As would be appreciated by one of ordinary skill in the art with the benefit of this disclosure, long streamer cables (e.g., longer than about 12 km) can pose several challenges. For example, the axial strength of a standard streamer cable may not be sufficient to withstand the towing forces incurred by a long streamer cable. As another example, increasing the length of streamer cables may increase drag, and thereby increase operational costs. As another example, the capacity of data buses in a standard streamer cable may not be sufficient for the data expected from a long streamer cable. For example, a long streamer cable may have many more receivers than a standard streamer cable, each acquiring data to be carried by the data buses. As another example, data signals along data buses in long streamer cables may require repeaters to boost the signal along the length of the long streamer cable. As another example, the capacity of power lines and/or power sources in a standard streamer cable may not be sufficient for the power demands expected from a long streamer cable. Moreover, low-frequency/long-offset data may be less useful for conventional imaging, especially 3D imaging, compared to high-frequency data.

Figure 3:
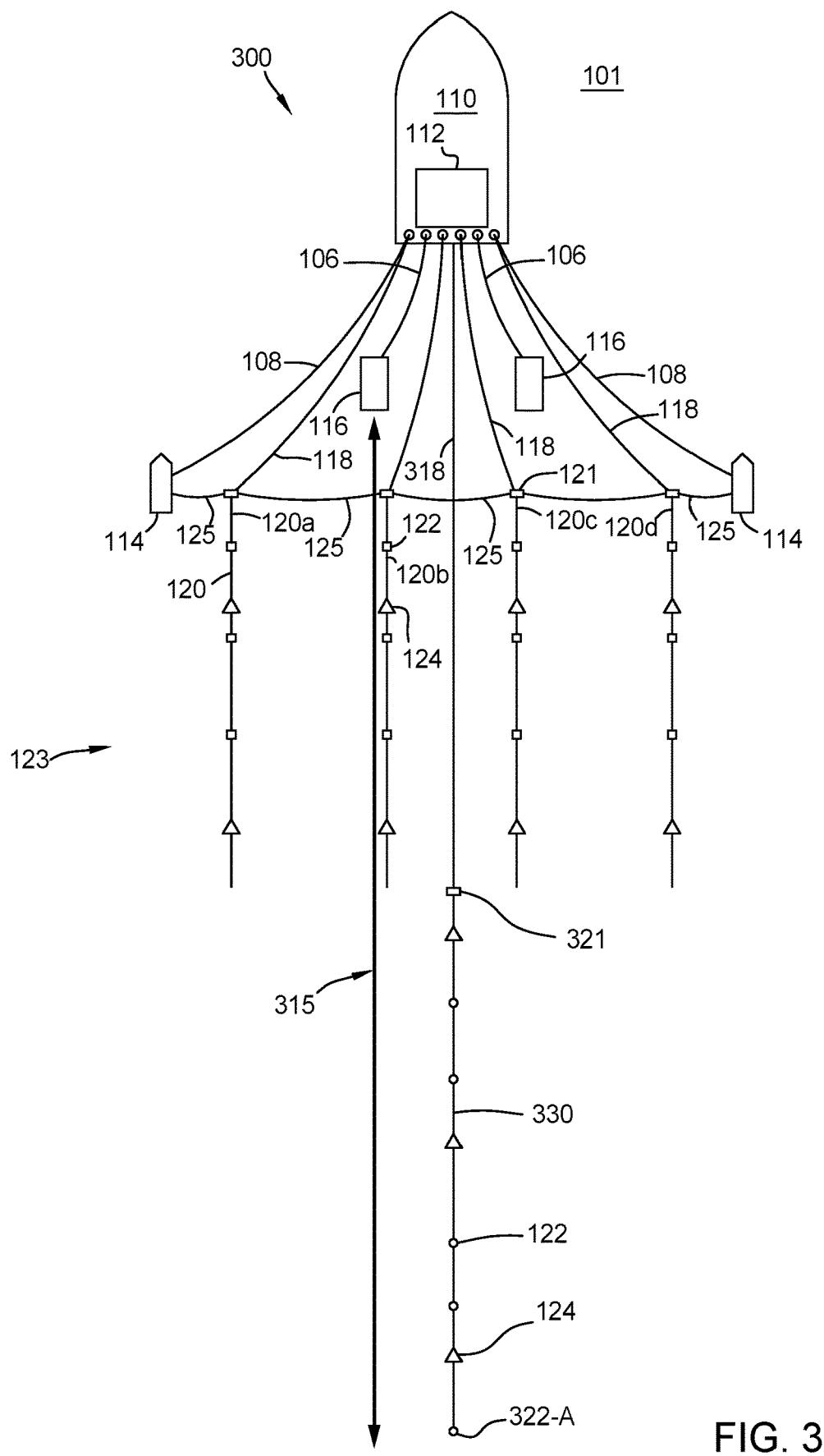
FIG. 3 illustrates another exemplary embodiment of a marine geophysical survey system configured for long-offset acquisition.

FIG. 3 illustrates another exemplary embodiment of a marine geophysical survey system 300 configured for long-offset acquisition. In many aspects, system 300 is configured similarly to systems 100 and 200. However, system 300 includes a long-offset lead-in line 318 coupled between source vessel 110 and long-offset streamer 330. In FIG. 3, long-offset lead-in line 318 is not coupled to, and may be disposed at a different depth than, spreader lines 125. In some embodiments, long-offset lead-in line 318 may be about the same length as the length of a standard lead-in line 118 plus the length of a standard streamer 120. In some embodiments, long-offset lead-in line 318 may be longer or shorter than the combined length of standard lead-in line 118 and standard streamer 120. In some embodiments, long-offset streamer 330 may be about the same length as the length of a standard streamer 120. For example, long-offset lead-in line 318 may be between about 5 km and about 20 km long, while long-offset streamer 330 may be between about 5 km and about 20 km long. In some embodiments, long-offset streamer 330 may be longer or shorter than the length of standard streamer 120. Long-offset streamer 330 may be coupled to long-offset lead-in line 318 with a long-offset lead-in termination 321. For example, long-offset lead-in termination 321 may be configured to couple between long-offset lead-in line 318 and long-offset streamer 330 aft of standard-offset survey spread 123. In some embodiments, long-offset lead-in termination 321 may be configured to couple between long-offset lead-in line 318 and long-offset streamer 330 aft of an inline midpoint of standard-offset survey spread 123. As with standard streamers 120 and long-offset streamer 230, long-offset streamer 330 may include receivers 122, streamer steering devices 124, and tail buoys. The number and distribution of receivers 122, streamer steering devices 124, and tail buoys along long-offset streamer 330 may be selected in accordance with manufacturing and operational circumstances or preferences. In some embodiments, receivers 122 on long-offset streamer 330 may be low-frequency seismic receivers configured to detect and/or measure low-frequency seismic signals (e.g., between about 1 Hz and about 7 Hz). In some embodiments, system 300 may have an aft-most receiver 322-A providing a longest offset 315 of between about 12 km and about 40 km. In some embodiments, long-offset streamer 330 may be less than about 12 km in length, while longest offset 315 may be greater than about 15 km. For example, the length of long-offset lead-in line 318 may be about 5 km, the length of long-offset streamer 330 may be about 12 km, and longest offset 315 may be about 17 km.

In some embodiments, long-offset lead-in line 318 may be positively or neutrally buoyant (e.g., have more buoyancy than standard lead-in line 118). For example, long-offset lead-in line 318 may be configured to float at or near (e.g. no more than about 10 m below) the surface of body of water 101. In some embodiments, the long-offset lead-in line 318 may be made of and/or filled with buoyant material. In some embodiments, the long-offset lead-in line 318 may have floatation devices attached along its length. As would be understood by one of ordinary skill in the art with the benefit of this disclosure, buoyant long-offset lead-in lines may provide several advantages. Drag is always a concern when equipment is towed behind a survey vessel. The length of long-offset lead-in lines 318 may make drag a heightened concern. However, buoyant long-offset lead-in lines may reduce drag by reducing the surface area exposed to water while towing. Additionally, as previously discussed, spreader lines 125 may nominally fix the lateral positions of standard streamers 120 and their associated standard lead-in lines 118. However, long-offset lead-in line 318 may not be coupled to spreader lines 125. Entanglement of the lead-in lines may be avoided by towing standard lead-in lines 118 (and spreader lines 125) at a different depth than long-offset lead-in line 318. Since standard lead-in lines 118 are typically towed between about 5 m and about 50 m depth (to match the towing depths of their associated standard streamers 120), a buoyant long-offset lead-in line 318 may mitigate entanglement risks.

Figure 4:
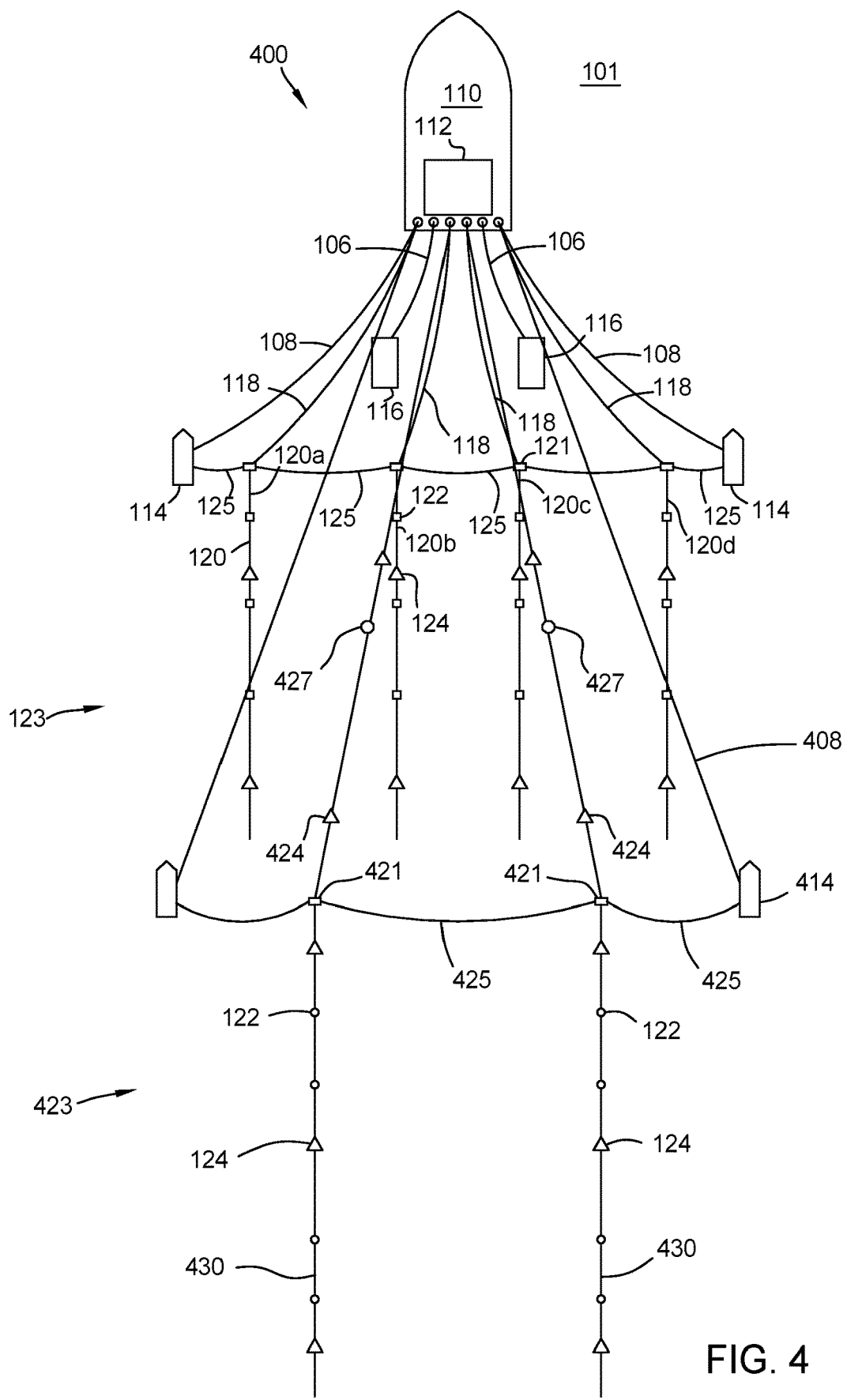
FIG. 4 illustrates another exemplary embodiment of a marine geophysical survey system configured for long-offset acquisition.

FIG. 4 illustrates another exemplary embodiment of a marine geophysical survey system 400 configured for long-offset acquisition. In many aspects, system 400 is configured similarly to systems 100, 200, and 300. However, system 400 includes a long-offset survey spread 423 that includes two long-offset streamers 430. As illustrated, a long-offset lead-in line 418 couples between each long-offset streamers 430 and source vessel 110. Each of the long-offset streamers 430 may be coupled to the respective long-offset lead-in line 418 with a long-offset lead-in termination 421. For example, each long-offset lead-in termination 421 may be configured to couple between the respective long-offset lead-in line 418 and long-offset streamer 430 aft of standard-offset survey spread 123. In some embodiments, each long-offset lead-in termination 421 may be configured to couple between the respective long-offset lead-in line 418 and long-offset streamer 430 aft of an inline midpoint of standard-offset survey spread 123. Long-offset lead-in terminations 421 may be coupled to or associated with long-offset spreader lines 425 so as to nominally fix the lateral positions of long-offset streamers 430 with respect to each other and with respect to a centerline of source vessel 110. As shown, system 400 may also include two long-offset paravanes 414 coupled to source vessel 110 via long-offset paravane tow lines 408. Long-offset paravanes 414 may be used to provide a streamer separation force for long-offset survey spread 423. In the illustrated embodiment, long-offset spreader lines 425 are towed aft of standard-offset survey spread 123. In some embodiments (e.g., when standard-offset survey spread 123 and long-offset survey spread 423 are towed at different depths), long-offset spread lines 425 may be towed aft of spreader lines 125 but not aft of standard-offset survey spread 123. As with system 300, long-offset lead-in lines 418 are not coupled to, and may be disposed at a different depth than, spreader lines 125. As with standard streamers 120, long-offset streamer 230, and long-offset streamer 330, long-offset streamers 430 may include receivers 122, streamer steering devices 124, and tail buoys. The number and distribution of receivers 122, streamer steering devices 124, and tail buoys along each long-offset streamer 430 may be selected in accordance with manufacturing and operational circumstances or preferences. In some embodiments, receivers 122 on long-offset streamer 430 may be low-frequency seismic receivers configured to detect and/or measure low-frequency seismic signals (e.g., between about 1 Hz and about 7 Hz).

In some embodiments, long-offset lead-in lines 418 may include one or more lead-in steering devices 424. Similar to streamer steering devices 124, lead-in steering devices 424 may provide controlled lateral and/or vertical forces to long-offset lead-in lines 418 as they are towed through the water.

In some embodiments, each long-offset lead-in line 418 may be coupled to a depth control buoy 427. For example, the depth control buoy 427 may be coupled to long-offset lead-in line 418 at, or forward of, long-offset lead-in termination 421. As another example, the depth control buoy 427 may be coupled to long-offset lead-in line 418 at, or forward of, spreader lines 125. As another example, the depth control buoy 427 may be coupled to long-offset lead-in line 418 near (e.g., within about 100 m) source vessel 110. Depth control buoy 427 may control the depth of a portion (e.g., the front end) of long-offset lead-in line 418. In some embodiments, depth control buoy 427 is coupled to long-offset lead-in line 418 by a remotely controlled (e.g. radio-controlled) winch. For example, depth control buoy 427 and any winch thereon may be managed from an instrument room onboard the source vessel 110. In some embodiments, the depth control buoy 427 may be configured to communicate with the source vessel 110 to provide remote control of the depth of the long-offset lead-in line 418, and/or remote monitoring of technical information about the depth control buoy 427, such as humidity and voltage. In some embodiments, the winch may be powered by an onboard power supply, which can include, for example, a battery and a power harvester, such as an underwater generator, that provides power to the battery, to allow the depth control buoy 427 to be towed without maintenance for several months at the time.

Figure 5A:
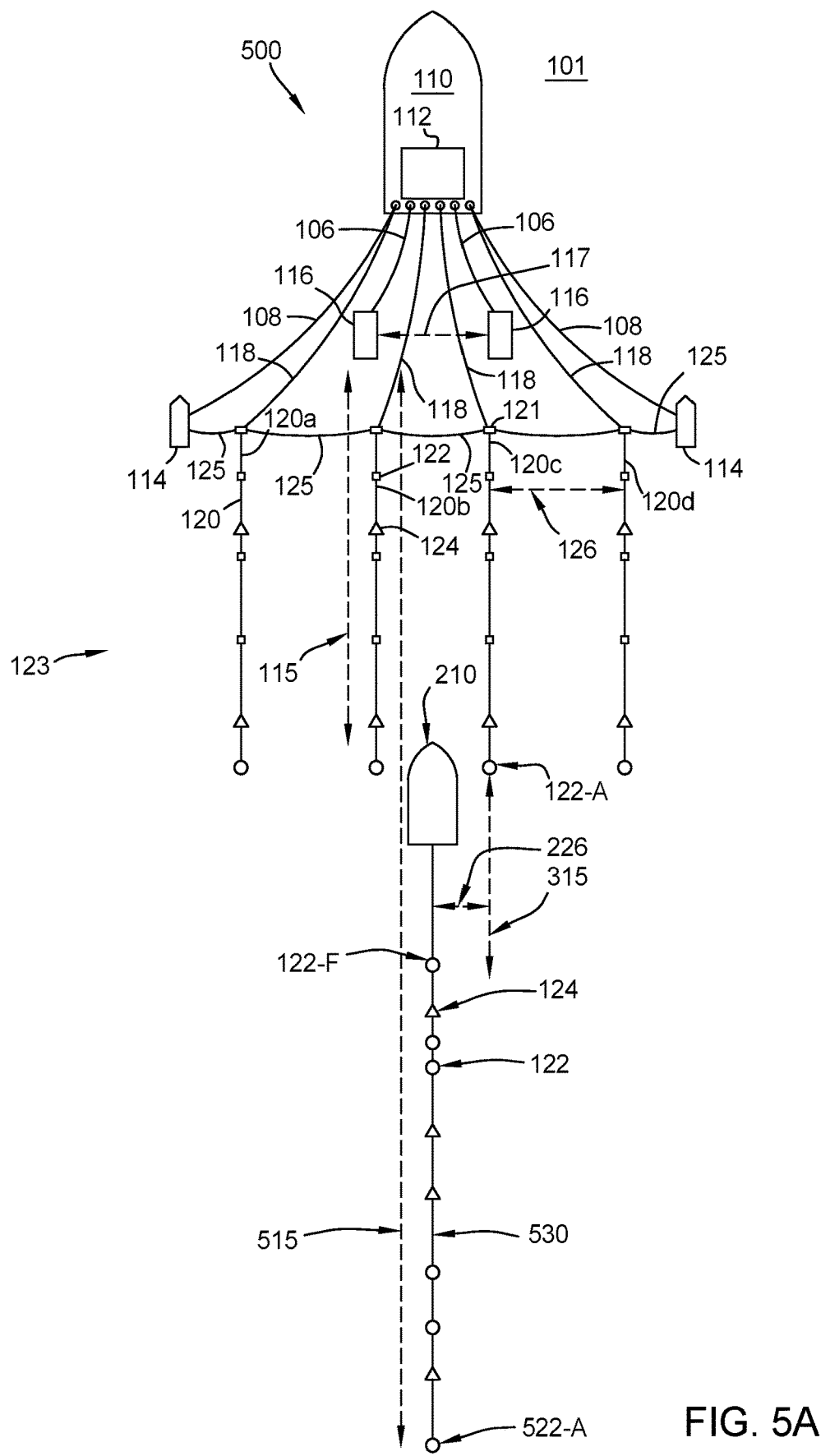
FIGS. 5A-5C illustrate other exemplary embodiments of marine geophysical survey systems configured for long-offset acquisition.

FIG. 5A illustrates another exemplary embodiment of a marine geophysical survey system 500 configured for long-offset acquisition. In many aspects, system 500 is configured similarly to system 200. However, system 500 includes a long-offset streamer 530 towed by long-offset streamer vessel 210. For example, each standard streamer 120 may be between about 5 km and about 12 km long, while long-offset streamer 530 may be between about 12 km and about 50 km long. As illustrated, long-offset streamer 530 is coupled to long-offset streamer vessel 210. For example, long-offset streamer 530 may be coupled to long-offset streamer vessel 210 via a lead-in line (not shown) and a lead-in termination (not shown). As with standard streamers 120, long-offset streamer 530 may include receivers 122, streamer steering devices 124, and/or tail buoys (not shown). The number and distribution of receivers 122, streamer steering devices 124, and/or tail buoys along long-offset streamer 530 may be selected in accordance with manufacturing and operational circumstances or preferences. In some embodiments, receivers 122 on long-offset streamer 530 may be low-frequency seismic receivers configured to detect and/or measure low-frequency seismic signals (e.g., between about 1 Hz and about 30 Hz, or between about 1 Hz and about 7 Hz). In some embodiments, system 500 may have an aft-most receiver 522-A providing a longest offset 515 of between about 20 km and about 60 km.

In some embodiments, communications equipment may be associated with long-offset streamer 530 for communicating (e.g., wirelessly) among various elements of long-offset streamer 530, among various elements of system 500, with other vessels, with on-shore facilities, etc. For example, communications equipment may be included as a component of the long-offset streamer vessel 210, of the tail buoy of long-offset streamer 530, or of any other component associated with long-offset streamer 530. The communications equipment may provide data communications between components of system 500, such as between receivers 122 of long-offset streamer 530 and recording system 112 of source vessel 110. For example, communications equipment may be useful for synchronizing shot times from signal sources 116 with recording times for data acquired by receivers 122 and/or recorded on long-offset streamer vessel 210.

In some embodiments, long-offset streamer vessel 210 may be an unmanned watercraft, such as a remotely-operated vehicle (ROV) and/or a depth control buoy. For example, the long-offset streamer vessel 210 may control the position and/or depth of a portion (e.g., the front end) of long-offset streamer 530 and/or any lead-in line coupled thereto. In some embodiments, long-offset streamer vessel 210 is coupled to long-offset streamer 530 by a remotely controlled (e.g. radio-controlled) winch. For example, long-offset streamer vessel 210 and any winch thereon may be managed from an instrument room onboard the source vessel 110. In some embodiments, the long-offset streamer vessel 210 may be configured to communicate with the source vessel 110 to provide remote control of the position and/or depth of the long-offset streamer 530, and/or remote monitoring of technical information about the long-offset streamer vessel 210, such as humidity and voltage. In some embodiments, the long-offset streamer vessel 210 and any winch thereon may be powered by an onboard power supply, which can include, for example, a battery and a power harvester, such as an underwater generator, that provides power to the battery, to allow the long-offset streamer vessel 210 to be operated without maintenance for several months at the time.

As illustrated in FIG. 5A, system 500 may be configured and/or operated so that long-offset streamer 530 is towed along a midline of the path of source vessel 110. The crossline spread separation 226 may be expressed as a crossline distance between long-offset streamer 530 and a nearest standard streamer 120 of standard-offset survey spread 123. In some embodiments, the crossline spread separation may be from about 0 m (e.g., in the case of a midline standard streamer 120) to about 100 m. For example, long-offset streamer vessel 210 may navigate a survey path that nominally follows the survey path of source vessel 110. As another example, any streamer steering devices 124 associated with long-offset streamer 530 may cause the long-offset streamer 530 to nominally follow along the midline of the path of source vessel 110. Likewise, in some embodiments, system 500 may be configured and/or operated so that long-offset streamer 530 is towed along a midline of the distributed signal sources 116. Likewise, in some embodiments, system 500 may be configured and/or operated so that long-offset streamer 530 is towed along a midline of the standard-offset survey spread 123.

Figure 5B:
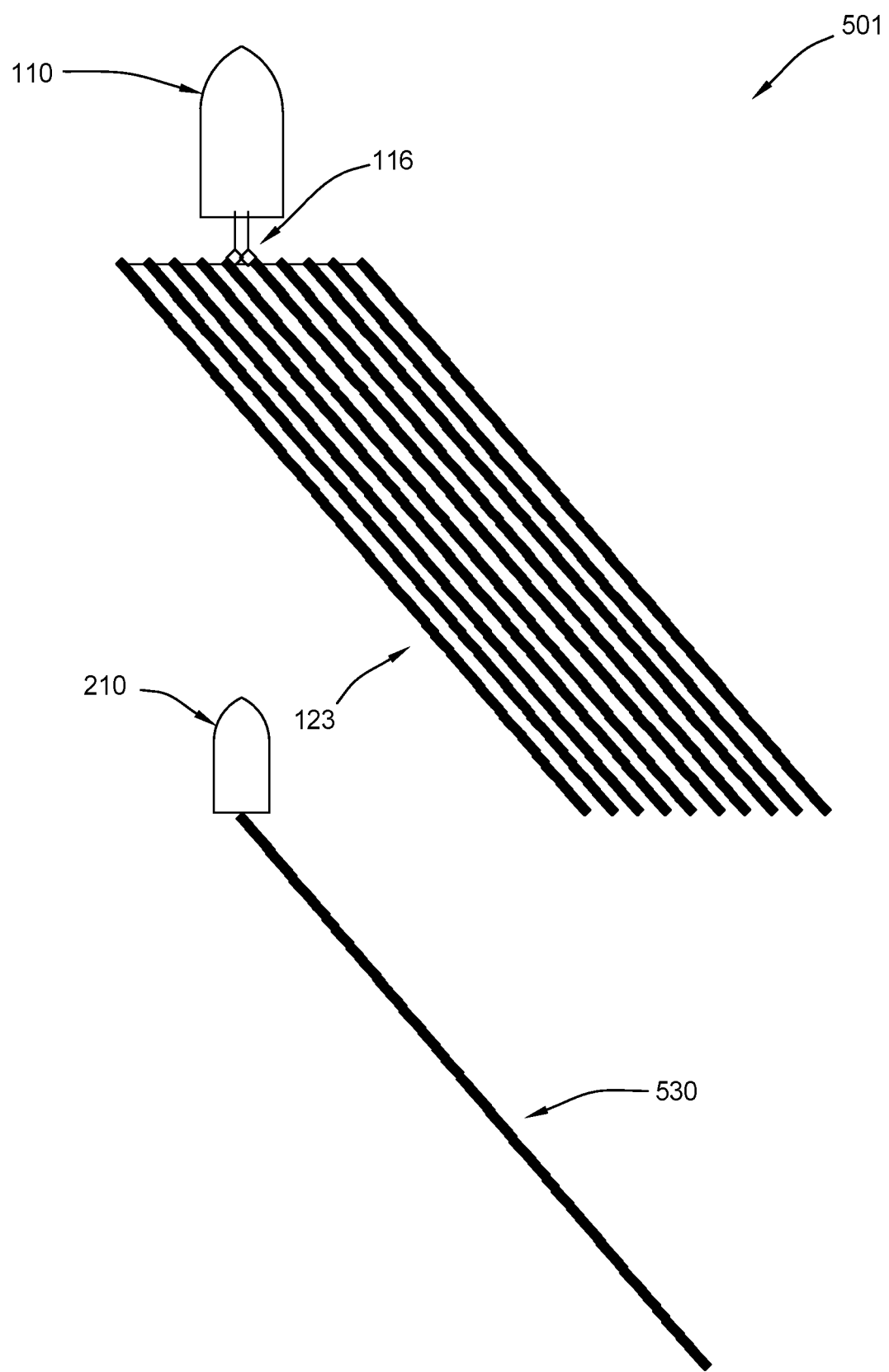
Figure 5C:
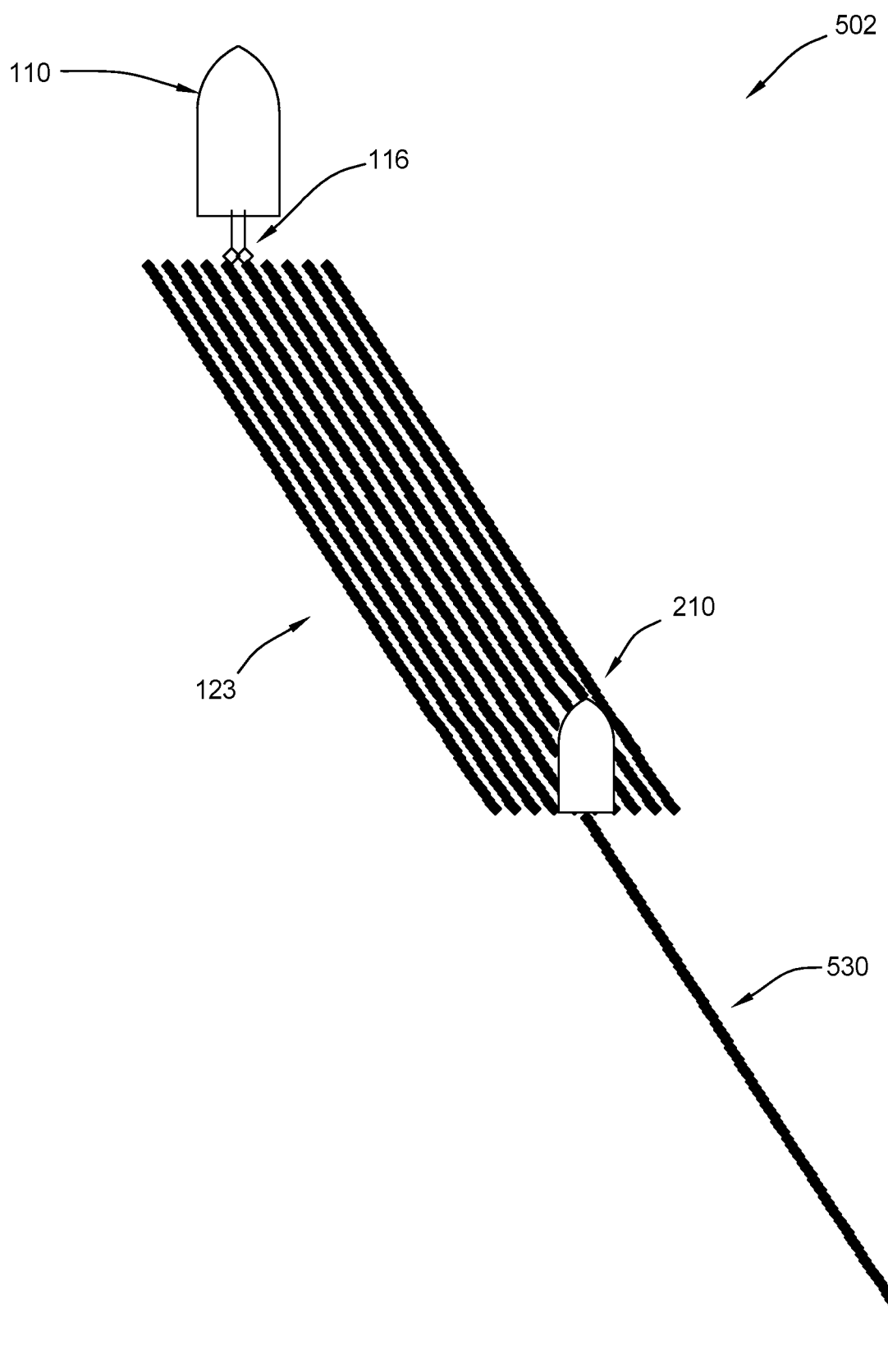

In some embodiments, system 500 may be configured and/or operated so that long-offset streamer 530 is towed port-ward or starboard-ward of a midline of the path of source vessel 110, the distributed signal sources 116, and/or the standard-offset survey spread 123. For example, long-offset streamer 530 may be towed between the midline of standard-offset survey spread 123 and an outermost (i.e., either port-most or starboard-most) standard streamers 120 thereof. In some embodiments, long-offset streamer 530 may be towed outside of standard-offset survey spread 123 (i.e., either port of the port-most, or starboard of the starboard-most, standard streamers 120 thereof). In some embodiments, long-offset streamer vessel 210 may be operated to navigate a survey path that does not nominally follow the survey path of source vessel 110, for example, to provide extended azimuthal and/or offset coverage. For example, FIGS. 5B and 5C illustrate exemplary embodiments of marine geophysical survey systems 501 and 502 configured for long-offset acquisition with feathering.

As illustrated in FIG. 5A, system 500 may be configured and/or operated so that long-offset streamer 530 is towed near (e.g., within about 100 m) or at the aft-most point of standard-offset survey spread 123. The inline spread separation 315 may be expressed as an inline distance between an aft-most receiver 122-A of standard-offset survey spread 123 and a forward-most receiver 122-F of long-offset streamer 530. In some embodiments, the inline spread separation may be from about −1 km (in the case of a forward-most receiver 122-F of long-offset streamer 530 preceding the aft-most receiver 122-A of standard-offset survey spread 123) to about 100 m. For example, long-offset streamer vessel 210 may navigate a survey path that nominally remains aft-ward of the aft-most point of standard-offset survey spread 123. As will be discussed further below, survey data may be more robust when long-offset streamer 530 is towed near or at the aft-most point of standard-offset survey spread 123. However, it should be appreciated that entanglement risks may increase as the towing position of long-offset streamer 530 approaches the standard-offset survey spread 123.

In some embodiments, long-offset streamer 530 is disposed at a different depth than standard-offset survey spread 123. For example, long-offset streamer 530 may have a nominal towing depth of from about 20 m to about 100 m, or more particularly from about 40 m to about 60 m, while standard-offset survey spread 123 may have a nominal towing depth from about 5 m to about 15 m. As would be understood by one of ordinary skill in the art with the benefit of this disclosure, seismic streamers have been typically towed at shallow depths (e.g., about 10 m-about 15 m) due to concerns about streamer ghost notches in the amplitude spectrum within the seismic frequency range. The nominal towing depth may be achieved by one or more of: operating long-offset streamer vessel 210 at a selected depth, constructing and/or adapting long-offset streamer 530 to be neutrally buoyant at a particular depth, equipping long-offset streamer 530 with one or more depth control devices (e.g., depressors) distributed at one or more points along the length of long-offset streamer 530, and/or utilizing a tail buoy with active and/or passive depth control. In some embodiments, towing long-offset streamer 530 at a greater depth may provide improved low frequency data acquisition, possibly at the expense of high frequency data acquisition by receivers 122 on long-offset streamer 530. It is currently believed that low-frequency/long-offset data may be more beneficial in than high-frequency/long-offset data for purposes such as FWI.

In some embodiments—which may include towing long-offset streamer 530 at a different depth than standard-offset survey spread 123—long-offset streamer 530 is towed forward of the aft-most point of standard-offset survey spread 123. For example, long-offset streamer vessel 210 may navigate a survey path that nominally precedes the aft-most point of standard-offset survey spread 123. In such instances, the inline spread separation 315 may be expected to be from about −5 km to about −100 m. For example, the long-offset streamer vessel 210 may interleave with the standard-offset survey spread 123 at least to the extent of any lead-in line for long-offset streamer 530.

In some embodiments, long-offset streamer 530 includes two or more discontinuous segments that are towed nominally inline with one another. For example, each segment may have a length from about 5 km to about 12 km. Each segment may be otherwise configured similarly to long-offset streamer 530 as previously discussed. Each segment may include a respective long-offset streamer vessel 210 and/or a tail buoy. The segments may be of similar or different lengths. At times and/or in some embodiments, the segments may be towed with nominal inline separations (between neighboring segments) of up to 5 km. The separations between different pairs of neighboring segments may be of similar or different lengths.

In another exemplary embodiment, parameters of system 500 may be as follows:

| Parameter | Value |
|---|---|
| number of signal sources 116 | 2 |
| crossline source separation 117 | 50 m |
| number of standard streamers 120 in standard-offset survey spread 123 | 10 |
| crossline streamer spacing 126 | 100 m |
| width of standard-offset survey spread 123 | 900 m |
| longest offset 115 of standard-offset survey spread 123 | 10 km |
| length of long-offset streamer 530 | 10 km |
| longest offset 515 of long-offset streamer 530 | 20 km |
| inline spread separation 315 | 0 m |
| crossline spread separation 226 | 50 m |

In this exemplary embodiment, the two signal sources 116 are fired in an alternating (e.g., standard flip-flop) pattern (e.g., the first source resets while the second source fires, and vice versa, at least in part to allow for more closely-spaced shots).

Figure 6:
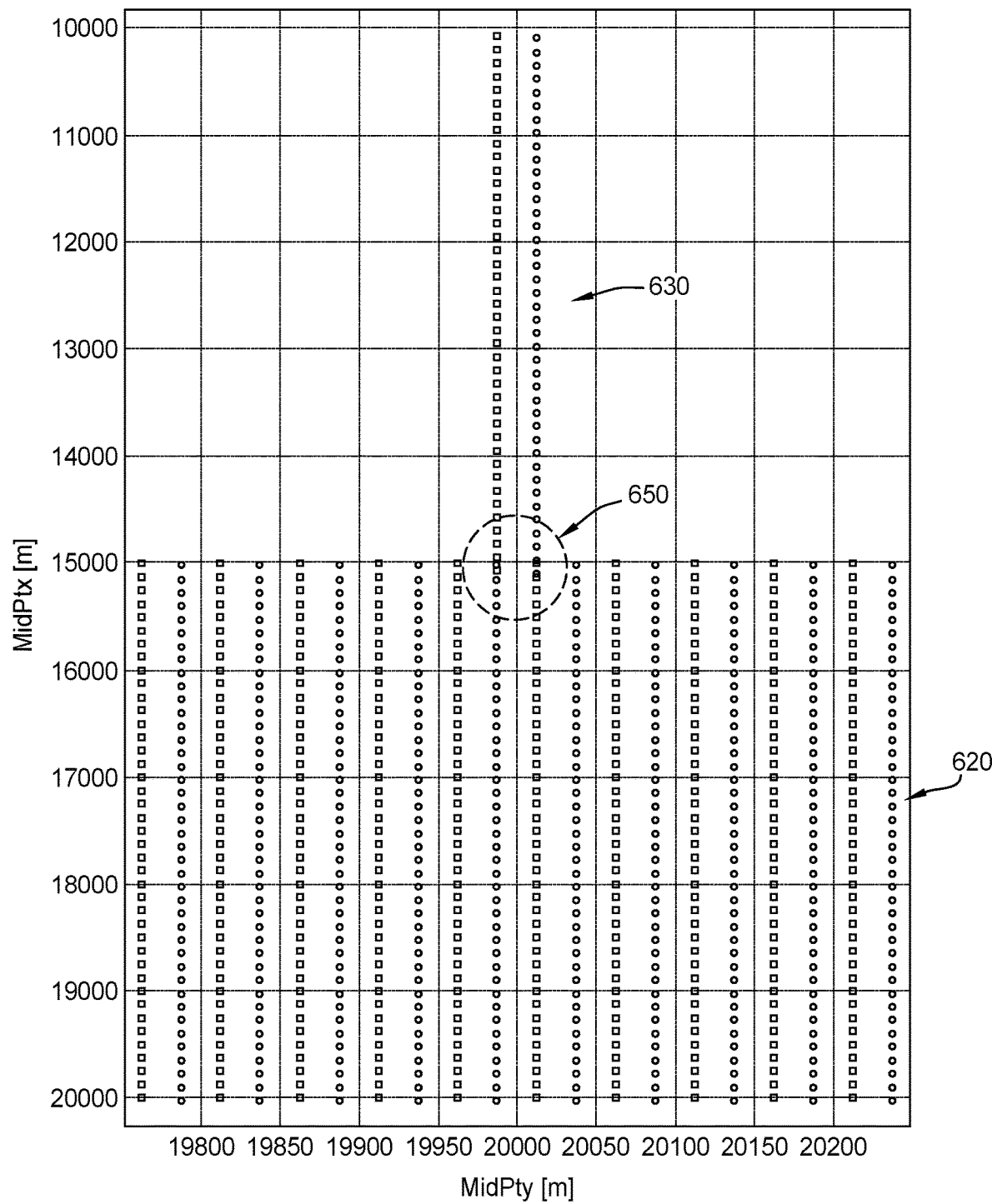
FIG. 6 illustrates a common midpoint distribution that may result from a survey with the marine geophysical survey system of FIG. 5A.

The resulting common midpoint (CMP) distribution after two shot firings is illustrated in FIG. 6 (CMPs from flip shots are circular, while CMPs from flop shots are rectangular). Note that the CMP lines 630 for the long-offset streamer 530 are continuous with the CMP lines 620 for the standard-offset survey spread 123, albeit resulting from opposite sources (due to the signal sources 116 being closer to the midline than each of the standard streamers 120, but farther from the midline for long-offset streamer 530). Note also that the crossline separation between adjacent CMP lines (25 m) is 25% of that of the crossline streamer spacing 126 (100 m). It is currently believed that interpolation (e.g., in the inline direction) may be successfully used in area 650 to account for the change from flip to flop in the CMP lines. Moreover, it is expected that interpolation will work well beyond typical frequency limits for FWI (e.g., from about 0.5 Hz to about 15 Hz).

Figure 7:
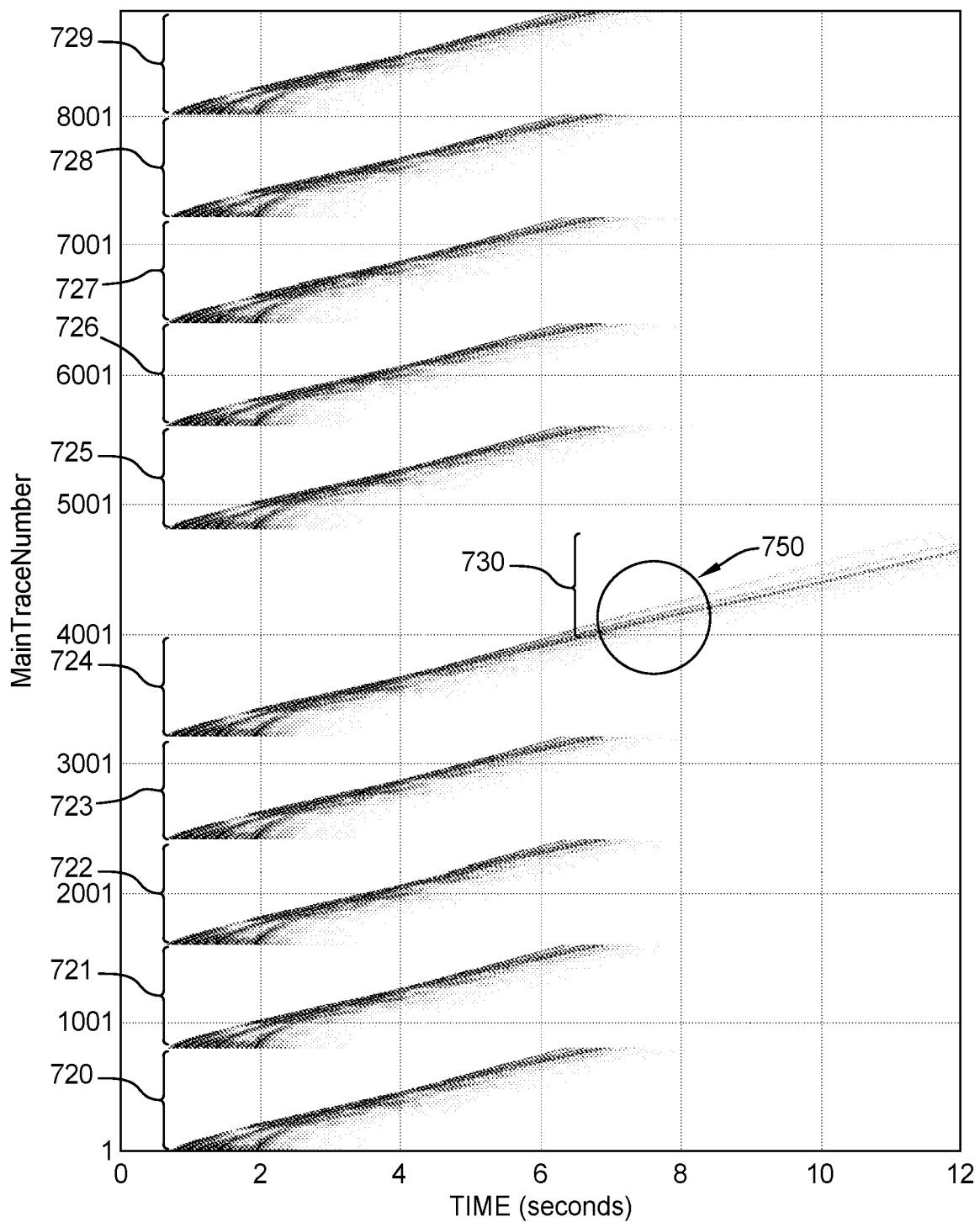
FIG. 7 illustrates synthetic shot gathers that may result from a survey with the marine geophysical survey system of FIG. 5A.

FIG. 7 illustrates synthetic shot gathers based on a system model according to the exemplary embodiment illustrated in FIG. 6. As illustrated, shot gathers 720-729 are generated from receivers 122 on standard streamers 120, while shot gather 730 is generated from receivers 122 on long-offset streamer 530. For example, shot gathers 724 and 725 may represent data from receivers on standard streamers nearest the midline of source vessel 110, while shot gathers 720 and 729 may represent data from receivers on standard streamers farthest from the midline of source vessel 110. It can be seen that shot gathers 720-729 provide data to about 7 seconds, while shot gather 730 provides data from about 7 seconds to about 12 seconds. Note that continuity for reflections is given over the whole offset range, including potential-interpolation area 750.

Figure 8:
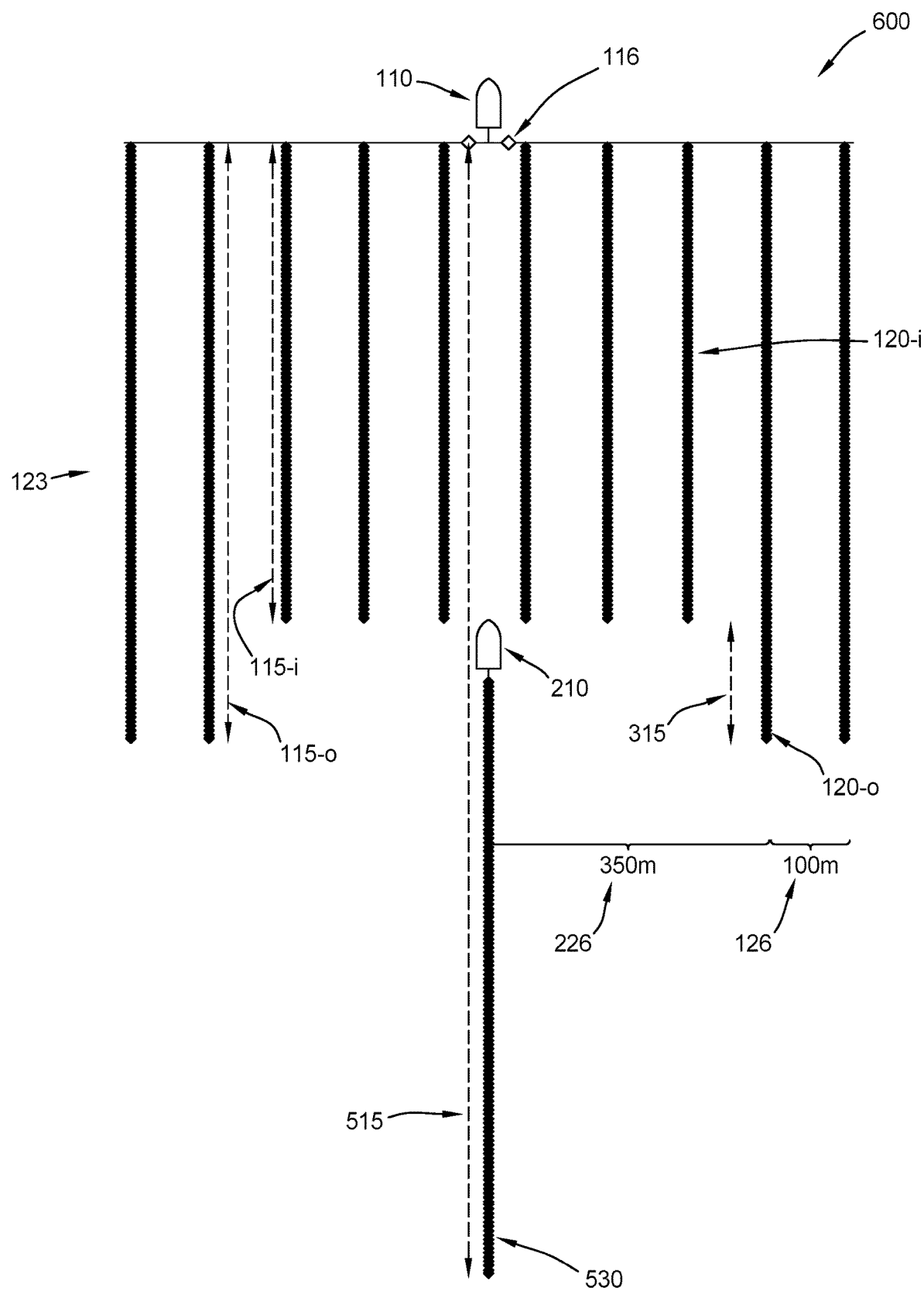
FIG. 8 illustrates another exemplary embodiment of a marine geophysical survey system configured for long-offset acquisition.

FIG. 8 illustrates another exemplary embodiment of a marine geophysical survey system 600 configured for long-offset acquisition. In many aspects, system 600 is configured similarly to system 500. However, in system 600, the standard streamers 120 of standard-offset survey spread 123 have two different lengths: about 8 km for the inner six standard streamers 120-*i*, and about 10 km for the outer four standard streamers 120-*o*. Parameters of system 600 may be as follows:

| Parameter | Value |
| --- | --- |
| number of signal sources 116 | 2 |
| crossline source separation 117 | 50 m |
| number of standard streamers 120 in standard-offset survey spread 123 | 10 |
| crossline streamer spacing 126 | 100 m |
| width of standard-offset survey spread 123 | 900 m |
| longest offset 115-i of inner 6 streamers of standard-offset survey spread 123 | 8 km |
| longest offset 115-o of outer 4 streamers of standard-offset survey spread 123 | 10 km |
| length of long-offset streamer 530 | 10 km |
| longest offset 515 of long-offset streamer 530 | 19 km |
| inline spread separation 315 | −1 km |
| crossline spread separation 226 | 350 m |

Note that, in this exemplary embodiment, the forward-most end of the long-offset streamer 530 is towed near or at the aft-most end of the inner six streamers 120-*i* of the standard-offset survey spread 123, but forward (by about 1 km) of the aft-most end of the outer four streamers 120-*o* of the standard-offset survey spread 123. Consequently, for measuring crossline spread separation 226, the nearest standard streamer 120 is an interior streamer of the four outer streamers 120-*o* of standard-offset survey spread 123. This type of configuration may reduce operational risk (e.g., entanglement risk) by towing the long-offset streamer 530 between the outer 4 streamers (which are longer than the inner 4 streamers). This type configuration may also reduce the extent and/or complexity of interpolation that may be utilized to account for the change from flip to flop in the CMP lines. For example, use of interpolation may be increased when long-offset streamer vessel 210 does not cross over the standard-offset survey spread 123, thus incurring a gap between the aft-most receiver of the standard-offset survey spread 123 and forward-most receiver of the long-offset streamer 530.

Figure 9:
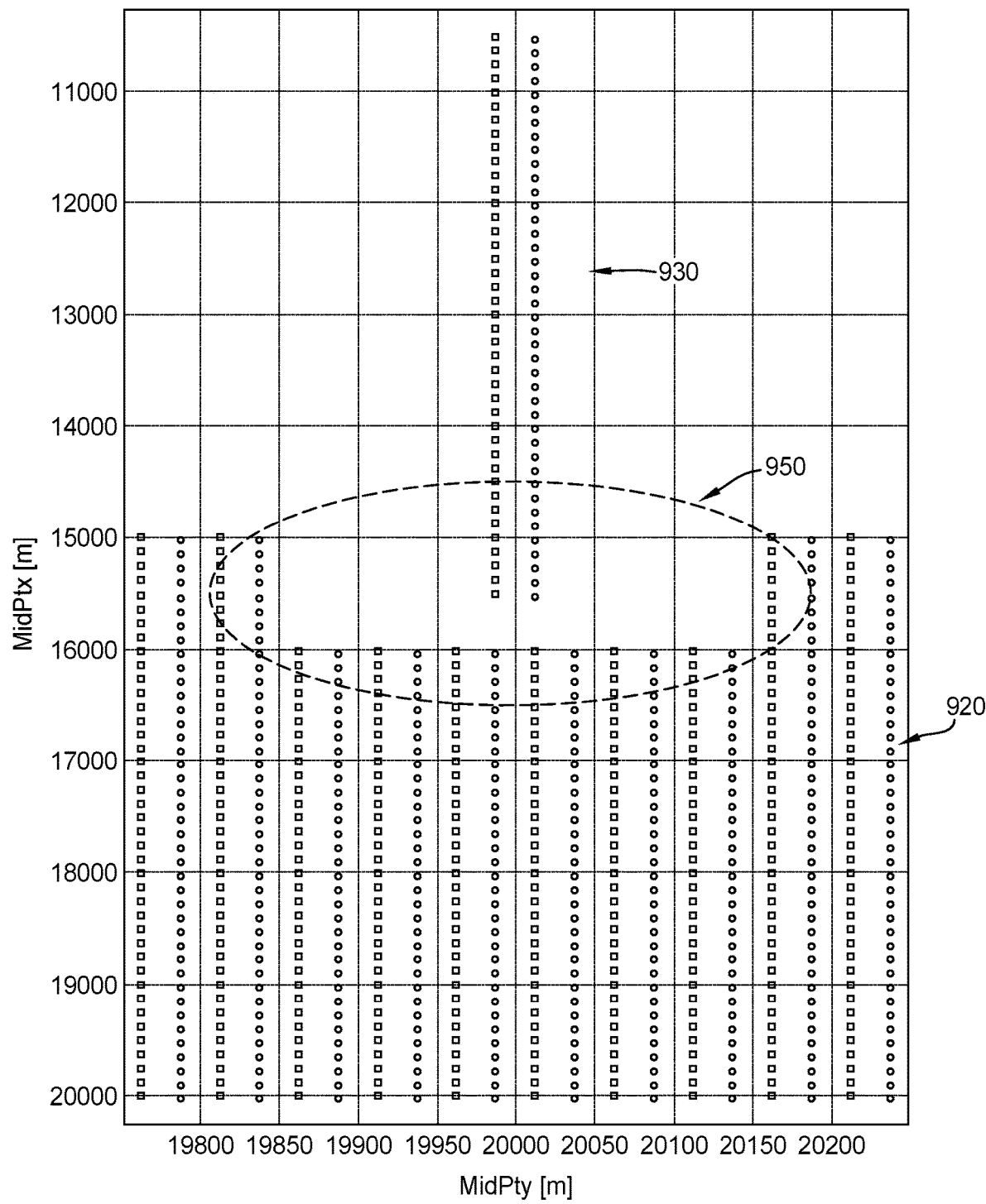
FIG. 9 illustrates a common midpoint distribution that may result from a survey with the marine geophysical survey system FIG. 8.

The resulting CMP distribution after two shot firings, of the exemplary embodiment shown in FIG. 8, is illustrated in FIG. 9. Note that, unlike in FIG. 6, the CMP lines 930 for the long-offset streamer 530 are not continuous with the CMP lines 920 for the standard-offset survey spread 123. Here, similar to FIG. 6, the CMP lines 930 for the long-offset streamer 530 result from opposite sources from the CMP lines 920 for the standard-offset survey spread 123. Note also that the crossline separation between adjacent CMP lines (25 m) is 25% of that of the crossline streamer spacing 126 (100 m). It is currently believed that the extent and/or complexity of interpolation (e.g., in the inline direction) may be successfully used in area 950 to account for the change from flip to flop in the CMP lines. Note that data for interpolation is available from more than one direction. In addition, the inline gap (between the CMP distribution from receivers on long-offset streamer 530 and the CMP distribution from receivers on the standard-offset survey spread 123) may be about 500 m, while the crossline gap may be only about 150 m. This way, interpolation can be run or stabilized from the sides, thus reducing the overall effort and required amount of assumptions. Moreover, it is expected that interpolation will work well beyond typical frequency limits for FWI (e.g., from about 0.5 Hz to about 15 Hz).

Figure 10:
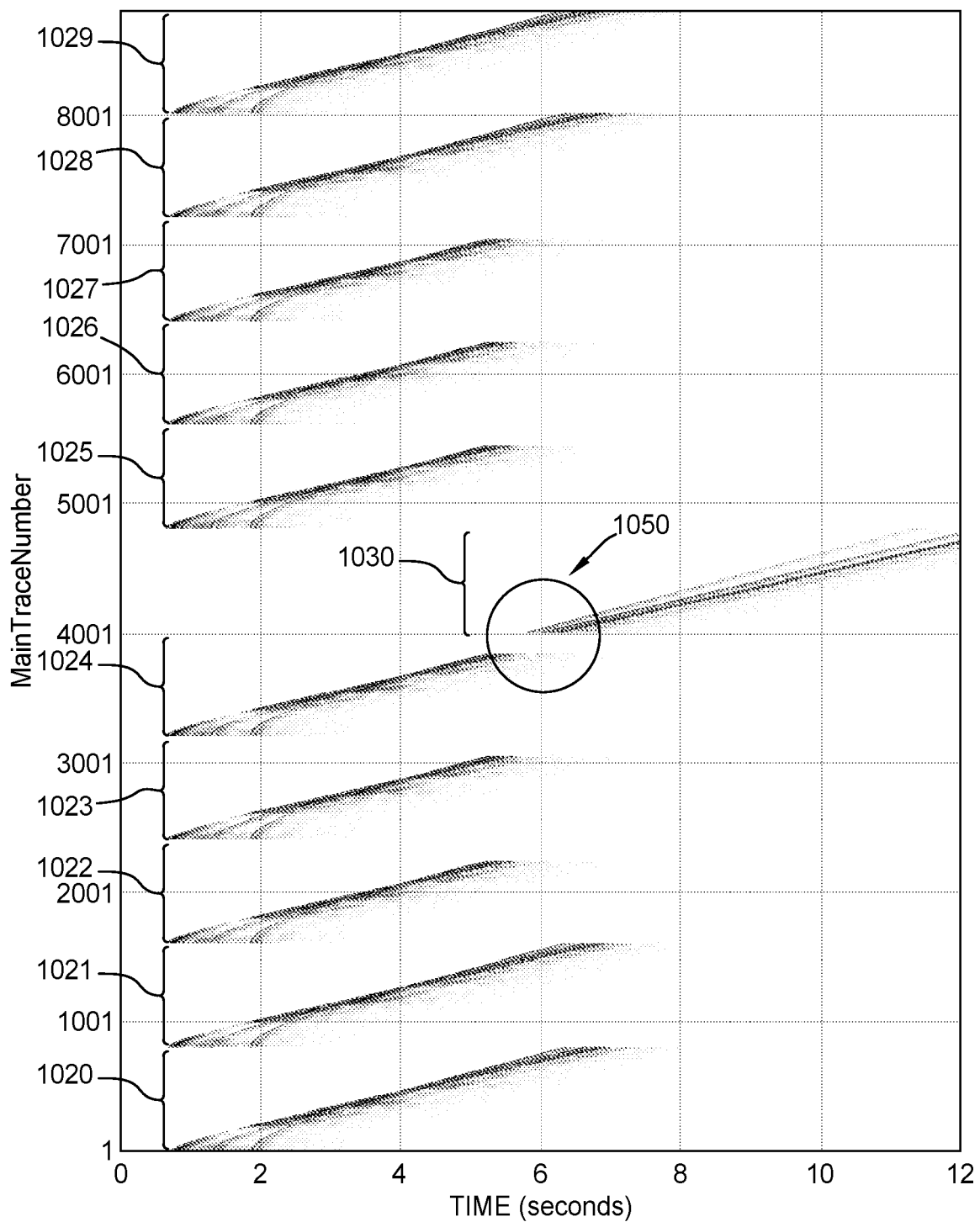
FIG. 10 illustrates synthetic shot gathers that may result from a survey with the marine geophysical survey system of FIG. 8.

FIG. 10 illustrates synthetic shot gathers based on a system model according to the exemplary embodiment illustrated in FIGS. 8-9. As illustrated, shot gathers 1020-1029 are generated from receivers 122 on standard streamers 120, while shot gather 1030 is generated from receivers 122 on long-offset streamer 530. For example, shot gathers 1022-1027 may represent data from receivers on inner standard streamers 120-*i*, while shot gather 1020, 1021, 1028, 1029 may represent data from receivers on one of the outer standard streamers 120-*o*. It can be seen that shot gathers 1020, 1021, 1028, 1029 provide data to about 7 seconds, shot gathers 1022-1027 provide data to about 5.5 seconds, and shot gather 1030 provides data from about 6 seconds to about 12 seconds. Note the discontinuity for reflections in potential-interpolation area 1050.

In some embodiments, data and/or electronic components of long-offset streamer 230, 330, 430, 530 may be configured differently than those of standard streamer 120. For example, receivers are often configured in groups on a streamer. A group of receivers may share a data bus, a battery, a memory unit, and/or other electronic components. Data from the group of receivers may be stored and/or analyzed as a set. A typical length of a receiver group of a standard streamer 120 may be about 12.5 m. Data and/or electronic components of receiver groupings may be reconfigured for long-offset streamers, for example to accommodate the length of the streamer, the length of the offset, and/or the expected frequency of the data. As an example, a length of a receiver group for a long-offset streamer may be between about 20 m and about 30 m. Note that source signals at or above about 60 Hz may experience aliasing for typical group lengths, while source signals at about 30 Hz may experience aliasing for group length of up to about 25 m. It is currently believed that aliasing will not occur (or not substantially degrade the signal) for even longer group lengths when the source signal is between about 1 Hz and about 30 Hz.

In some embodiments, two or more long-offset streamers 230, 330, 430 may be towed behind the source vessel 110. For example, two long-offset streamers 230 may be coupled to two standard lead-in lines 118 with lead-in terminations 121. As another example, three long-offset streamers 430 may be coupled to three long-offset lead-in lines 418 with long-offset lead-in terminations 421. It should be appreciated that increasing the number of long-offset streamers may increase drag, and thereby increase operational costs. The number of long-offset streamers to employ in a geophysical survey system may be selected to balance improvements from additional long-offset (e.g., low frequency) data against additional costs. In some embodiments, the number of long-offset streamers will be between about 10% and about 50% of the number of standard streamers.

In some embodiments, source vessel 110 may tow one or more signal sources 116 while not towing any standard streamers 120, such embodiment still including at least one long-offset streamer 230, 330, 430, 530. Such configurations may provide beneficial savings in acquiring long-offset data with the use of a single source vessel, but may compromise the ability to simultaneously acquire data at both standard offsets and at long offsets. Such configurations may be useful, for example, in conjunction with data acquisition with receivers deployed at or on the bottom of the body of water (e.g., ocean-bottom node receivers). For example, in some embodiments, long-offset streamer 230 along with other components of system 200 may be utilized in conjunction with data acquisition with receivers deployed at or on the bottom of the body of water (e.g., ocean-bottom node receivers). As another example, in some embodiments, long-offset streamer 530 along with other components of system 500 may be utilized in conjunction with data acquisition with receivers deployed at or on the bottom of the body of water (e.g., ocean-bottom node receivers).

In some embodiments, a second source vessel (not shown) may tow one or more signal sources 116, while source vessel 110 may tow one or more long-offset streamers 230, 330, 430. In such embodiments, the second source vessel may be positioned so that the signal sources 116 are not inline with the one or more long-offset streamers 230, 330, 430. In such embodiments, source vessel 110 may optionally tow one or more standard streamers 120. The one or more long-offset streamers 230, 330, 430 may thereby acquire wide-azimuth data (i.e., data characterized by a crossline source-receiver separation greater than half of the width of the survey spread) from the signal sources 116 towed by the second source vessel.

The methods and systems described herein may be used to manufacture a geophysical data product indicative of certain properties of a subsurface formation. The geophysical data product may include geophysical data such as pressure data, particle motion data, particle velocity data, particle acceleration data, and any seismic image that results from using the methods and systems described above. The geophysical data product may be stored on a non-transitory computer-readable medium as described above. The geophysical data product may be produced offshore (i.e., by equipment on a survey vessel) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

In accordance with a number of embodiments of the present disclosure, a geophysical data product may be produced. The geophysical data product may include, for example, data (e.g., low-frequency data) acquired by receivers of the long-offset streamer. Geophysical data, such as data previously collected by seismic sensors, electromagnetic sensors, depth sensors, location sensors, etc., may be obtained (e.g., retrieved from a data library) and may be recorded on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. For example, the computer-readable medium may be brought onshore. In some instances, once onshore in the United States, geophysical analysis, including further data processing, may be performed on the geophysical data product. In some instances, geophysical analysis may be performed offshore on the geophysical data product. In accordance with some embodiments, acquiring data with receivers of a long-offset streamer may be accompanied by one or more of: manufacturing a geophysical data product with the acquired data; processing the acquired data to produce an image of a subsurface formation; recording the geophysical data product or the image on one or more non-transitory, tangible computer-readable media; bringing the computer-readable media onshore; and performing geophysical analysis onshore on the geophysical data product.

In an embodiment, a geophysical survey system includes a source vessel; a signal source coupled to the source vessel; and a first long-offset streamer coupled to the source vessel, the first long-offset streamer including an aft-most receiver, and an offset between the signal source and the aft-most receiver being at least 12 km.

In one or more embodiments disclosed herein, the signal source comprises a seismic source.

In one or more embodiments disclosed herein, the first long-offset streamer comprises a seismic receiver.

In one or more embodiments disclosed herein, the seismic receiver is a low-frequency seismic receiver.

In one or more embodiments disclosed herein, the first long-offset streamer is at least 12 km in length.

In one or more embodiments disclosed herein, the system also includes a first long-offset lead-in coupled between the source vessel and the first long-offset streamer.

In one or more embodiments disclosed herein, the first long-offset lead-in is at least 5 km in length.

In one or more embodiments disclosed herein, the first long-offset lead-in comprises a lead-in steering device.

In one or more embodiments disclosed herein, the first long-offset lead-in is positively buoyant.

In one or more embodiments disclosed herein, the first long-offset streamer comprises a streamer steering device.

In one or more embodiments disclosed herein, the system also includes a plurality of standard streamers coupled to the source vessel, each of the standard streamers being no more than 12 km in length.

In one or more embodiments disclosed herein, the system also includes a standard-offset survey spread coupled to the source vessel.

In one or more embodiments disclosed herein, the system also includes a second long-offset streamer coupled to the source vessel.

In one or more embodiments disclosed herein, the system also includes a long-offset spreader line coupled between the first long-offset streamer and the second long-offset streamer.

In one or more embodiments disclosed herein, the system also includes a second signal source coupled to the source vessel.

In an embodiment, a method of geophysical surveying includes towing a signal source with a source vessel; towing a first long-offset streamer with the source vessel; and acquiring data with receivers of the first long-offset streamer.

In one or more embodiments disclosed herein, the signal source comprises a seismic source.

In one or more embodiments disclosed herein, the first long-offset streamer comprises a seismic receiver.

In one or more embodiments disclosed herein, the data includes low-frequency seismic signals.

In one or more embodiments disclosed herein, the first long-offset streamer is at least 12 km in length.

In one or more embodiments disclosed herein, the first long-offset streamer and the source vessel are coupled with a first long-offset lead-in.

In one or more embodiments disclosed herein, the first long-offset lead-in is at least 5 km in length.

In one or more embodiments disclosed herein, the first long-offset lead-in comprises a lead-in steering device.

In one or more embodiments disclosed herein, the first long-offset lead-in is positively buoyant.

In one or more embodiments disclosed herein, the first long-offset streamer comprises a streamer steering device.

In one or more embodiments disclosed herein, the first long-offset streamer comprises an aft-most receiver, and an offset between the signal source and the aft-most receiver is at least 12 km.

In one or more embodiments disclosed herein, the method also includes towing a standard-offset survey spread with the source vessel.

In one or more embodiments disclosed herein, the first long-offset streamer is towed at a different depth than the standard-offset survey spread.

In one or more embodiments disclosed herein, the method also includes towing a second long-offset streamer with the source vessel.

In one or more embodiments disclosed herein, the first long-offset streamer and the second long-offset streamer are coupled with a long-offset spreader line.

In one or more embodiments disclosed herein, the method also includes at least one of: manufacturing a geophysical data product with the acquired data; processing the acquired data to produce an image of a subsurface formation; recording the geophysical data product or the image on one or more non-transitory, tangible computer-readable media; bringing the computer-readable media onshore; and performing geophysical analysis onshore on the geophysical data product.

In an embodiment, a method of geophysical surveying includes towing a signal source with a first survey vessel; towing a long-offset streamer with a second survey vessel, the long-offset streamer having a plurality of receivers; actuating the signal source while an offset between the signal source and at least one of the plurality of receivers is at least 15 km; and acquiring data with receivers of the long-offset streamer.

In one or more embodiments disclosed herein, the length of the long-offset streamer is greater than 12 km.

In one or more embodiments disclosed herein, the first survey vessel is different from the second survey vessel.

In one or more embodiments disclosed herein, the signal source is not inline with the long-offset streamer.

In one or more embodiments disclosed herein, the data includes wide-azimuth data.

In one or more embodiments disclosed herein, the signal source comprises a seismic source; the long-offset streamer comprises a seismic receiver; and the data includes low-frequency seismic signals.

In one or more embodiments disclosed herein, the method also includes towing a standard-offset survey spread with the second survey vessel.

In one or more embodiments disclosed herein, the long-offset streamer is towed at a different depth than the standard-offset survey spread.

In an embodiment, a geophysical survey system includes one and only one source vessel; a signal source coupled to the source vessel; a long-offset streamer vessel; and a long-offset streamer coupled to the streamer vessel, wherein: the long-offset streamer comprises an aft-most receiver, and an offset between the signal source and the aft-most receiver is at least 12 km.

In one or more embodiments disclosed herein, the signal source comprises a seismic source.

In one or more embodiments disclosed herein, the long-offset streamer comprises a seismic receiver.

In one or more embodiments disclosed herein, the seismic receiver is a low-frequency seismic receiver.

In one or more embodiments disclosed herein, the long-offset streamer is at least 12 km in length.

In one or more embodiments disclosed herein, the long-offset streamer comprises a streamer steering device.

In one or more embodiments disclosed herein, the long-offset streamer comprises a plurality of segments; the system further comprises a plurality of long-offset streamer vessels; and each of the plurality of segments is coupled to one of the plurality of streamer vessels.

In one or more embodiments disclosed herein, the system also includes a plurality of standard streamers coupled to the source vessel, each of the standard streamers being no more than 12 km in length.

In one or more embodiments disclosed herein, the system also includes a standard-offset survey spread coupled to the source vessel.

In one or more embodiments disclosed herein, the system also includes a second signal source coupled to the source vessel.

In an embodiment, a method of geophysical surveying includes operating one and only one source vessel; towing a signal source with the source vessel; towing a long-offset streamer with a long-offset streamer vessel; and acquiring data with the signal source and receivers of the long-offset streamer.

In one or more embodiments disclosed herein, the signal source comprises a seismic source.

In one or more embodiments disclosed herein, the long-offset streamer comprises a seismic receiver.

In one or more embodiments disclosed herein, the data includes low-frequency seismic signals.

In one or more embodiments disclosed herein, the long-offset streamer is at least 12 km in length.

In one or more embodiments disclosed herein, the long-offset streamer comprises a streamer steering device.

In one or more embodiments disclosed herein, the source vessel follows a first survey path, and the streamer vessel follows a different, second survey path.

In one or more embodiments disclosed herein, the method also includes towing a standard-offset survey spread with the source vessel; and compensating for feathering of the standard-offset survey spread with the second survey path.

In one or more embodiments disclosed herein, the long-offset streamer comprises a plurality of segments; and the method further comprises towing each of the plurality of segments with a respective one of a plurality of long-offset streamer vessels.

In one or more embodiments disclosed herein, each of the plurality of segments is towed inline with the others of the plurality of segments.

In one or more embodiments disclosed herein, the long-offset streamer comprises an aft-most receiver, and an offset between the signal source and the aft-most receiver is at least 12 km.

In one or more embodiments disclosed herein, the method also includes towing a standard-offset survey spread with the source vessel.

In one or more embodiments disclosed herein, the long-offset streamer is towed at a different depth than the standard-offset survey spread.

In one or more embodiments disclosed herein, the method also includes communicating data from the receivers to a recording system on the source vessel.

In one or more embodiments disclosed herein, the method also includes at least one of: manufacturing a geophysical data product with the acquired data; processing the acquired data to produce an image of a subsurface formation; recording the geophysical data product or the image on one or more non-transitory, tangible computer-readable media;

bringing the computer-readable media onshore; and performing geophysical analysis onshore on the geophysical data product.

In an embodiment, a method of geophysical surveying includes operating one and only one source vessel during a survey; towing a signal source with the source vessel; towing a long-offset streamer with a long-offset streamer vessel, the long-offset streamer having a plurality of receivers; actuating the signal source while an offset between the signal source and at least one of the plurality of receivers is at least 15 km; and acquiring data with the signal source and receivers of the long-offset streamer.

In one or more embodiments disclosed herein, a length of the long-offset streamer is greater than 12 km.

In one or more embodiments disclosed herein, the signal source is not inline with the long-offset streamer.

In one or more embodiments disclosed herein, the data includes wide-azimuth data.

In one or more embodiments disclosed herein, the signal source comprises a seismic source; the long-offset streamer comprises a seismic receiver; and the data includes low-frequency seismic signals.

In one or more embodiments disclosed herein, the method also includes towing a standard-offset survey spread with the source vessel.

In one or more embodiments disclosed herein, the long-offset streamer is towed at a different depth than the standard-offset survey spread.

In one or more embodiments disclosed herein, the long-offset streamer comprises a plurality of segments; and the method further comprises towing each of the plurality of segments with a respective one of a plurality of long-offset streamer vessels.

In one or more embodiments disclosed herein, the method also includes maintaining a uniform inline distance between the source vessel and the streamer vessel during the survey.

While the foregoing is directed to embodiments of the present disclosure, other and further embodiments of the disclosure may be devised without departing from the basic scope thereof, and the scope thereof is determined by the claims that follow.

The invention claimed is:

1. A method of geophysical surveying, comprising:
operating one and only one source vessel;
towing a signal source with the source vessel, wherein the source vessel follows a survey path;
towing a long-offset streamer with a long-offset streamer vessel, wherein the long-offset streamer vessel follows the survey path aft of the source vessel;
acquiring data with the signal source and receivers of the long-offset streamer;
towing a standard-offset survey spread with the source vessel; and
acquiring data with the signal source and receivers of the standard-offset survey spread.

2. A geophysical survey system, comprising:
one and only one source vessel;
a signal source coupled to the source vessel;
a plurality of first streamers coupled to the source vessel, each of the first streamers being no more than 12 km in length;
a long-offset streamer comprising a plurality of segments; and
a plurality of long-offset streamer vessels, wherein each of the plurality of segments is coupled to a respective one of the plurality of streamer vessels.

3. A method of geophysical surveying, comprising:
operating one and only one source vessel;
towing a signal source with the source vessel;
towing a standard-offset survey spread with the source vessel, wherein each streamer of the standard-offset survey spread is no more than 12 km in length;
towing a long-offset streamer with a long-offset streamer vessel;
acquiring a first set of data with the signal source and receivers of the standard-offset survey spread; and
while acquiring the first set of data, acquiring a second set of data with the signal source and receivers of the long-offset streamer, wherein:
the long-offset streamer comprises an aft-most receiver, and
while acquiring the second set of data, an offset between the signal source and the aft-most receiver is at least 20 km.

4. The method of claim 3, further comprising, while acquiring the second set of data:
towing the long-offset streamer at a greater depth than the standard-offset survey spread; and
maintaining a uniform inline distance between the source vessel and the long-offset streamer vessel during the survey.

5. The method of claim 1, wherein:
crossline outer streamers of the standard-offset survey spread have longer lengths than crossline inner streamers of the standard-offset survey spread; and
the long-offset streamer vessel sails proximate to or aft of an aft-most end of the crossline inner streamers and forward of an aft-most end of the crossline outer streamers.

6. The method of claim 1, wherein:
the long-offset streamer vessel sails forward of an aft-most end of the standard-offset survey spread.

7. The method of claim 1, further comprising:
storing the acquired data in a non-transitory computer readable medium, thereby completing the manufacture of a geophysical data product.

8. The geophysical survey system of claim 2, wherein:
the first streamers comprise crossline outer streamers and crossline inner streamers;
the crossline outer streamers have longer lengths than the crossline inner streamers; and
at least one of the long-offset streamer vessels sails proximate to or aft of an aft-most end of the crossline inner streamers and forward of an aft-most end of the crossline outer streamers.

9. The geophysical survey system of claim 2, wherein:
at least one of the long-offset streamer vessels sails forward of an aft-most end of the first streamers.

10. The geophysical survey system of claim 2, further comprising:
a recording system onboard the source vessel and configured to store signals collected by geophysical sensors in the first streamers and in the long-offset streamer in a non-transitory computer readable medium.

11. The method of claim 3, wherein:
crossline outer streamers of the standard-offset survey spread have longer lengths than crossline inner streamers of the standard-offset survey spread; and
the long-offset streamer vessel sails proximate to or aft of an aft-most end of the crossline inner streamers and forward of an aft-most end of the crossline outer streamers.

12. The method of claim 3, wherein:
the long-offset streamer vessel sails forward of an aft-most end of the standard-offset survey spread.

13. The method of claim 3, further comprising:
storing at least one of the first set of data and the second set of data in a non-transitory computer readable medium, thereby completing the manufacture of a geophysical data product.

* * * * *